US012095923B2

(12) United States Patent
Dion et al.

(10) Patent No.: US 12,095,923 B2
(45) Date of Patent: Sep. 17, 2024

(54) SECURING CONTAINERIZED APPLICATIONS

(71) Applicant: Nokia Solutions and Networks Oy, Espoo (FI)

(72) Inventors: Gino Dion, Quispamsis (CA); Steve Boutilier, Sackville (CA); Chris McAloney, Halifax (CA); Colin Mackenzie, Largo, FL (US)

(73) Assignee: Nokia Solutions and Networks Oy, Espoo (FI)

( * ) Notice: Subject to any disclaimer, the term of this patent is extended or adjusted under 35 U.S.C. 154(b) by 322 days.

(21) Appl. No.: 17/507,142

(22) Filed: Oct. 21, 2021

(65) Prior Publication Data
US 2023/0131132 A1 Apr. 27, 2023

(51) Int. Cl.
*H04L 9/32* (2006.01)
*G06F 9/455* (2018.01)
*H04L 9/08* (2006.01)

(52) U.S. Cl.
CPC ........ *H04L 9/3239* (2013.01); *G06F 9/45558* (2013.01); *H04L 9/0825* (2013.01);
(Continued)

(58) Field of Classification Search
CPC ... H04L 9/3239; H04L 9/0825; H04L 9/3247; G06F 9/45558; G06F 2009/45562;
(Continued)

(56) References Cited

U.S. PATENT DOCUMENTS 10,002,247 B2 * 6/2018 Suarez .................... G06F 21/31
10,097,353 B1 * 10/2018 Carlson ................ H04L 67/306
(Continued)

FOREIGN PATENT DOCUMENTS

WO 2020229537 A1 11/2020

OTHER PUBLICATIONS

EP Search Report mailed in corresponding EP Application No. 22202244.4 on Mar. 20, 2023, 9 pages.

*Primary Examiner* — Matthew Smithers
(74) *Attorney, Agent, or Firm* — Tong, Rea, Bentley & Kim, LLC

(57) ABSTRACT

Various example embodiments for supporting security for containerized applications may be configured to support security for containerized applications deployed to customer devices. Various example embodiments for supporting security for containerized applications that are deployed to customer devices may be configured to properly secure and validate containerized applications that are deployed to customer devices. Various example embodiments for supporting security for containerized applications that are deployed to customer devices may be configured to secure and validate containerized applications that are deployed to customer devices based on a framework configured to monitor and secure download of containerized applications to protect against the download of non-approved or malicious containers and to monitor and secure the run-time execution of containerized applications in various types of execution environments, thereby providing a capability to verify that the containerized applications are approved and authorized by the service provider and that the customer device has not been compromised.

24 Claims, 7 Drawing Sheets

(52) U.S. Cl.
CPC .. *H04L 9/3247* (2013.01); *G06F 2009/45562* (2013.01); *G06F 2009/45587* (2013.01)

(58) Field of Classification Search
CPC ......... G06F 2009/45587; G06F 21/121; G06F 2221/033; G06F 21/51
See application file for complete search history.

(56) References Cited

U.S. PATENT DOCUMENTS

| | | | | |
|---|---|---|---|---|
| 10,666,443 | B2* | 5/2020 | Vyas | H04L 9/3247 |
| 10,877,750 | B1* | 12/2020 | Connolly | H04L 9/0897 |
| 11,138,314 | B1* | 10/2021 | Gettys | H04L 9/3239 |
| 11,212,366 | B2* | 12/2021 | Fitzer | G06F 8/61 |
| 11,520,876 | B2* | 12/2022 | Kumar | H04L 69/329 |
| 11,537,732 | B2* | 12/2022 | Wright | G06F 9/45558 |
| 11,574,056 | B2* | 2/2023 | Albero | G06F 21/563 |
| 11,762,986 | B2* | 9/2023 | Gerebe | G06F 21/54 |
| | | | | 726/1 |
| 2011/0085667 | A1* | 4/2011 | Berrios | H04L 9/3249 |
| | | | | 709/203 |
| 2013/0061314 | A1* | 3/2013 | De Atley | G06F 21/53 |
| | | | | 726/17 |
| 2015/0161155 | A1* | 6/2015 | Pletcher | G06F 3/0643 |
| | | | | 707/693 |
| 2017/0187540 | A1* | 6/2017 | Stopel | H04L 63/1433 |
| 2017/0199883 | A1* | 7/2017 | Terry | G06F 21/00 |
| 2018/0109387 | A1* | 4/2018 | Vyas | G06F 8/71 |
| 2018/0181760 | A1* | 6/2018 | Kumar | G06F 21/51 |
| 2018/0349610 | A1* | 12/2018 | Gupta | G06F 9/5077 |
| 2019/0294778 | A1* | 9/2019 | De Gaetano | G06F 21/552 |
| 2019/0356492 | A1* | 11/2019 | Picco | H04L 67/125 |
| 2020/0021615 | A1* | 1/2020 | Wainner | G06F 8/71 |
| 2020/0089914 | A1* | 3/2020 | Komatsubara | G06F 21/51 |
| 2021/0075626 | A1* | 3/2021 | Ilany | G06F 11/302 |
| 2021/0133312 | A1* | 5/2021 | Sugandhi | G06F 21/53 |
| 2021/0334399 | A1* | 10/2021 | Wright | G06F 21/6218 |
| 2021/0389958 | A1* | 12/2021 | Choi | G06F 9/4416 |
| 2022/0108001 | A1* | 4/2022 | Nye | G06F 21/44 |
| 2022/0147643 | A1* | 5/2022 | Tran | H04L 41/22 |
| 2022/0164214 | A1* | 5/2022 | Yu | G06F 8/65 |
| 2022/0171648 | A1* | 6/2022 | Rodriguez | G06F 9/4401 |
| 2022/0188436 | A1* | 6/2022 | Mika | G06F 21/31 |
| 2022/0335009 | A1* | 10/2022 | Paul | G06F 16/11 |
| 2022/0337417 | A1* | 10/2022 | Sanders | H04L 9/0643 |
| 2022/0417026 | A1* | 12/2022 | Grover | H04L 9/3236 |

\* cited by examiner

SECURING CONTAINERIZED APPLICATIONS

TECHNICAL FIELD

Various example embodiments relate generally to software management and, more particularly but not exclusively, to securing containerized applications.

BACKGROUND

Software management capabilities may be used to support remote management of software. For example, various Broadband Forum standards may be used for Software Module Management on managed customer premises equipment (CPE) devices by providing messaging to support basic lifecycle management of independent software modules that are part of one or more execution environments.

SUMMARY

In at least some example embodiments, an apparatus includes at least one processor and at least one memory including computer program code, wherein the at least one memory and the computer program code are configured, with the at least one processor, to cause the apparatus to at least receive, by a device, a file including a list of hash identifiers of authorized containerized applications, compute, at the device in response to a condition detected at the device, a hash of a containerized application to obtain a hash identifier of the containerized application, determine, at the device, whether the hash identifier of the containerized application is included in the list of hash identifiers of authorized containerized applications, determine, by the device based on interaction with a server, whether validation of the hash identifier of the containerized application by the server was successful or unsuccessful, and determine, at the device based on at least one of whether the hash identifier of the containerized application is included in the list of hash identifiers of authorized containerized applications or whether validation of the hash identifier of the containerized application by the server was successful or unsuccessful, handling of the containerized application at the device. In at least some example embodiments, the at least one memory and the computer program code are configured to, with the at least one processor, cause the apparatus to at least send, by the device toward the server based on a booting of the device, a request for the file. In at least some example embodiments, the at least one memory and the computer program code are configured to, with the at least one processor, cause the apparatus to at least validate, by the device based on validation of a validation signature received with the file, the file. In at least some example embodiments, the validation signature received with the file is validated based on a public key on the device. In at least some example embodiments, the public key is obtained from a base firmware image of the device. In at least some example embodiments, the condition detected at the device includes at least one of a booting or rebooting of the device, a download of the containerized application to the device, or a request to start the containerized application on the device. In at least some example embodiments, the hash of the containerized application is computed based on a Secure Hash Algorithm (SHA) hash. In at least some example embodiments, to determine whether validation of the hash identifier of the containerized application by the server was successful or unsuccessful, the at least one memory and the computer program code are configured to, with the at least one processor, cause the apparatus to at least send, by the device toward a server, a request for validation of the hash identifier of the containerized application and receive, by the device from the server, a validation response including an indication as to whether validation of the hash identifier of the containerized application by the server was successful or unsuccessful. In at least some example embodiments, the request for validation of the hash identifier of the containerized application is sent toward the server without a delay based on a determination that the hash identifier of the containerized application is not found in the list of hash identifiers of authorized containerized applications. In at least some example embodiments, the request for validation of the hash identifier of the containerized application is sent toward the server with a delay based on a determination that the hash identifier of the containerized application is found in the list of hash identifiers of authorized containerized applications. In at least some example embodiments, to determine the handling of the containerized application at the device, the at least one memory and the computer program code are configured to, with the at least one processor, cause the apparatus to at least determine, for a process for the containerized application initiated at the device, whether to permit the process to continue or to prevent the process from continuing. In at least some example embodiments, the process for the containerized application includes a download of the containerized application to the device or an execution of the containerized application at the device. In at least some example embodiments, to determine the handling of the containerized application at the device, the at least one memory and the computer program code are configured to, with the at least one processor, cause the apparatus to at least permit a process for the containerized application to continue on the device based on a determination that the hash identifier of the containerized application is included in the list of hash identifiers of authorized containerized applications and a determination that validation of the hash identifier of the containerized application by the server was successful. In at least some example embodiments, to determine the handling of the containerized application at the device, the at least one memory and the computer program code are configured to, with the at least one processor, cause the apparatus to at least prevent a process for the containerized application from continuing on the device based on a determination that the hash identifier of the containerized application is not included in the list of hash identifiers of authorized containerized applications or a determination that validation of the hash identifier of the containerized application by the server was unsuccessful. In at least some example embodiments, the condition detected at the device includes initiation of execution of the containerized application on the device. In at least some example embodiments, to determine the handling of the containerized application at the device, the at least one memory and the computer program code are configured to, with the at least one processor, cause the apparatus to at least permit execution of the containerized application to continue on the device based on a determination that the validation response includes an indication that validation of the hash identifier of the containerized application by the server was successful. In at least some example embodiments, the at least one memory and the computer program code are configured to, with the at least one processor, cause the apparatus to at least prevent execution of the containerized application from continuing on the device based on a determination that the validation response includes an indication that validation of the hash identifier of the containerized application by the server was unsuccessful. In at least some example embodiments, the at least one memory and the computer program code are configured to, with the at least one processor, cause the apparatus to at least compute, at the device in response to a download of the containerized application to the device, a hash of a complete tarball of the containerized application, determine, at the device, whether the hash of the complete tarball of the containerized application is included in the file, and determine, at the device based on whether the hash of the complete tarball of the containerized application is included in the file, handling of the download of the containerized application at the device. In at least some example embodiments, to determine the handling of the download of the containerized application at the device, the at least one memory and the computer program code are configured to, with the at least one processor, cause the apparatus to at least permit the containerized application to remain on the device based on a determination that the hash of the complete tarball of the containerized application is included in the file. In at least some example embodiments, to determine the handling of the download of the containerized application at the device, the at least one memory and the computer program code are configured to, with the at least one processor, cause the apparatus to at least remove the containerized application from the device based on a determination that the hash of the complete tarball of the containerized application is not included in the file. In at least some example embodiments, the hash of the complete tarball of the containerized application is a Message-Digest (MD) Algorithm hash. In at least some example embodiments, the device includes at least one of a residential gateway, a WiFi access point, a fixed cellular access point, an optical network termination, a modem, a router, a firewall, a cable set-top box, a computer, a smartphone, or an Internet-of-Things device.

In at least some example embodiments, a non-transitory computer readable medium stores computer program code configured to cause an apparatus to at least receive, by a device, a file including a list of hash identifiers of authorized containerized applications, compute, at the device in response to a condition detected at the device, a hash of a containerized application to obtain a hash identifier of the containerized application, determine, at the device, whether the hash identifier of the containerized application is included in the list of hash identifiers of authorized containerized applications, determine, by the device based on interaction with a server, whether validation of the hash identifier of the containerized application by the server was successful or unsuccessful, and determine, at the device based on at least one of whether the hash identifier of the containerized application is included in the list of hash identifiers of authorized containerized applications or whether validation of the hash identifier of the containerized application by the server was successful or unsuccessful, handling of the containerized application at the device. In at least some example embodiments, the computer program code is configured to cause the apparatus to at least send, by the device toward the server based on a booting of the device, a request for the file. In at least some example embodiments, the computer program code is configured to cause the apparatus to at least validate, by the device based on validation of a validation signature received with the file, the file. In at least some example embodiments, the validation signature received with the file is validated based on a public key on the device. In at least some example embodiments, the public key is obtained from a base firmware image of the device. In at least some example embodiments, the condition detected at the device includes at least one of a booting or rebooting of the device, a download of a containerized application to the device, or a request to start the containerized application on the device. In at least some example embodiments, the hash of the containerized application is computed based on a Secure Hash Algorithm (SHA) hash. In at least some example embodiments, to determine whether validation of the hash identifier of the containerized application by the server was successful or unsuccessful, the computer program code is configured to cause the apparatus to at least send, by the device toward a server, a request for validation of the hash identifier of the containerized application and receive, by the device from the server, a validation response including an indication as to whether validation of the hash identifier of the containerized application by the server was successful or unsuccessful. In at least some example embodiments, the request for validation of the hash identifier of the containerized application is sent toward the server without a delay based on a determination that the hash identifier of the containerized application is not found in the list of hash identifiers of authorized containerized applications. In at least some example embodiments, the request for validation of the hash identifier of the containerized application is sent toward the server with a delay based on a determination that the hash identifier of the containerized application is found in the list of hash identifiers of authorized containerized applications. In at least some example embodiments, to determine the handling of the containerized application at the device, the computer program code is configured to cause the apparatus to at least determine, for a process for the containerized application initiated at the device, whether to permit the process to continue or to prevent the process from continuing. In at least some example embodiments, the process for the containerized application includes a download of the containerized application to the device or an execution of the containerized application at the device. In at least some example embodiments, to determine the handling of the containerized application at the device, the computer program code is configured to cause the apparatus to at least permit a process for the containerized application to continue on the device based on a determination that the hash identifier of the containerized application is included in the list of hash identifiers of authorized containerized applications and a determination that validation of the hash identifier of the containerized application by the server was successful. In at least some example embodiments, to determine the handling of the containerized application at the device, the computer program code is configured to cause the apparatus to at least prevent a process for the containerized application from continuing on the device based on a determination that the hash identifier of the containerized application is not included in the list of hash identifiers of authorized containerized applications or a determination that validation of the hash identifier of the containerized application by the server was unsuccessful. In at least some example embodiments, the condition detected at the device includes initiation of execution of the containerized application on the device. In at least some example embodiments, to determine the handling of the containerized application at the device, the computer program code is configured to cause the apparatus to at least permit execution of the containerized application to continue on the device based on a determination that the validation response includes an indication that validation of the hash identifier of the containerized application by the server was successful. In at least some example embodiments, the computer program code is configured to cause the apparatus to at least prevent execution of the containerized application from continuing on the device based on a determination that the validation response includes an indication that validation of the hash identifier of the containerized application by the server was unsuccessful. In at least some example embodiments, the computer program code is configured to cause the apparatus to at least compute, at the device in response to a download of the containerized application to the device, a hash of a complete tarball of the containerized application, determine, at the device, whether the hash of the complete tarball of the containerized application is included in the file, and determine, at the device based on whether the hash of the complete tarball of the containerized application is included in the file, handling of the download of the containerized application at the device. In at least some example embodiments, to determine the handling of the download of the containerized application at the device, the computer program code is configured to cause the apparatus to at least permit the containerized application to remain on the device based on a determination that the hash of the complete tarball of the containerized application is included in the file. In at least some example embodiments, to determine the handling of the download of the containerized application at the device, the computer program code is configured to cause the apparatus to at least remove the containerized application from the device based on a determination that the hash of the complete tarball of the containerized application is not included in the file. In at least some example embodiments, the hash of the complete tarball of the containerized application is a Message-Digest (MD) Algorithm hash. In at least some example embodiments, the device includes at least one of a residential gateway, a WiFi access point, a fixed cellular access point, an optical network termination, a modem, a router, a firewall, a cable set-top box, a computer, a smartphone, or an Internet-of-Things device.

In at least some example embodiments, a method includes receiving, by a device, a file including a list of hash identifiers of authorized containerized applications, computing, at the device in response to a condition detected at the device, a hash of a containerized application to obtain a hash identifier of the containerized application, determining, at the device, whether the hash identifier of the containerized application is included in the list of hash identifiers of authorized containerized applications, determining, by the device based on interaction with a server, whether validation of the hash identifier of the containerized application by the server was successful or unsuccessful, and determining, at the device based on at least one of whether the hash identifier of the containerized application is included in the list of hash identifiers of authorized containerized applications or whether validation of the hash identifier of the containerized application by the server was successful or unsuccessful, handling of the containerized application at the device. In at least some example embodiments, the method includes sending, by the device toward the server based on a booting of the device, a request for the file. In at least some example embodiments, the method includes validating, by the device based on validation of a validation signature received with the file, the file. In at least some example embodiments, the validation signature received with the file is validated based on a public key on the device. In at least some example embodiments, the public key is obtained from a base firmware image of the device. In at least some example embodiments, the condition detected at the device includes at least one of a booting or rebooting of the device, a download of the containerized application to the device, or a request to start the containerized application on the device. In at least some example embodiments, the hash of the containerized application is computed based on a Secure Hash Algorithm (SHA) hash. In at least some example embodiments, determining whether validation of the hash identifier of the containerized application by the server was successful or unsuccessful includes sending, by the device toward a server, a request for validation of the hash identifier of the containerized application and receiving, by the device from the server, a validation response including an indication as to whether validation of the hash identifier of the containerized application by the server was successful or unsuccessful. In at least some example embodiments, the request for validation of the hash identifier of the containerized application is sent toward the server without a delay based on a determination that the hash identifier of the containerized application is not found in the list of hash identifiers of authorized containerized applications. In at least some example embodiments, the request for validation of the hash identifier of the containerized application is sent toward the server with a delay based on a determination that the hash identifier of the containerized application is found in the list of hash identifiers of authorized containerized applications. In at least some example embodiments, determining the handling of the containerized application at the device includes determining, for a process for the containerized application initiated at the device, whether to permit the process to continue or to prevent the process from continuing. In at least some example embodiments, the process for the containerized application includes a download of the containerized application to the device or an execution of the containerized application at the device. In at least some example embodiments, determining the handling of the containerized application at the device includes permitting a process for the containerized application to continue on the device based on a determination that the hash identifier of the containerized application is included in the list of hash identifiers of authorized containerized applications and a determination that validation of the hash identifier of the containerized application by the server was successful. In at least some example embodiments, determining the handling of the containerized application at the device includes preventing a process for the containerized application from continuing on the device based on a determination that the hash identifier of the containerized application is not included in the list of hash identifiers of authorized containerized applications or a determination that validation of the hash identifier of the containerized application by the server was unsuccessful. In at least some example embodiments, the condition detected at the device includes initiation of execution of the containerized application on the device. In at least some example embodiments, determining the handling of the containerized application at the device includes permitting execution of the containerized application to continue on the device based on a determination that the validation response includes an indication that validation of the hash identifier of the containerized application by the server was successful. In at least some example embodiments, the method includes preventing execution of the containerized application from continuing on the device based on a determination that the validation response includes an indication that validation of the hash identifier of the containerized application by the server was unsuccessful. In at least some example embodiments, the method includes computing, at the device in response to a download of the containerized application to the device, a hash of a complete tarball of the containerized application, determining, at the device, whether the hash of the complete tarball of the containerized application is included in the file, and determining, at the device based on whether the hash of the complete tarball of the containerized application is included in the file, handling of the download of the containerized application at the device. In at least some example embodiments, determining the handling of the download of the containerized application at the device includes permitting the containerized application to remain on the device based on a determination that the hash of the complete tarball of the containerized application is included in the file. In at least some example embodiments, determining the handling of the download of the containerized application at the device includes removing the containerized application from the device based on a determination that the hash of the complete tarball of the containerized application is not included in the file. In at least some example embodiments, the hash of the complete tarball of the containerized application is a Message-Digest (MD) Algorithm hash. In at least some example embodiments, the device includes at least one of a residential gateway, a WiFi access point, a fixed cellular access point, an optical network termination, a modem, a router, a firewall, a cable set-top box, a computer, a smartphone, or an Internet-of-Things device.

In at least some example embodiments, an apparatus includes means for receiving, by a device, a file including a list of hash identifiers of authorized containerized applications, means for computing, at the device in response to a condition detected at the device, a hash of a containerized application to obtain a hash identifier of the containerized application, means for determining, at the device, whether the hash identifier of the containerized application is included in the list of hash identifiers of authorized containerized applications, means for determining, by the device based on interaction with a server, whether validation of the hash identifier of the containerized application by the server was successful or unsuccessful, and means for determining, at the device based on at least one of whether the hash identifier of the containerized application is included in the list of hash identifiers of authorized containerized applications or whether validation of the hash identifier of the containerized application by the server was successful or unsuccessful, handling of the containerized application at the device. In at least some example embodiments, the apparatus includes means for sending, by the device toward the server based on a booting of the device, a request for the file. In at least some example embodiments, the apparatus includes means for validating, by the device based on validation of a validation signature received with the file, the file. In at least some example embodiments, the validation signature received with the file is validated based on a public key on the device. In at least some example embodiments, the public key is obtained from a base firmware image of the device. In at least some example embodiments, the condition detected at the device includes at least one of a booting or rebooting of the device, a download of the containerized application to the device, or a request to start the containerized application on the device. In at least some example embodiments, the hash of the containerized application is computed based on a Secure Hash Algorithm (SHA) hash. In at least some example embodiments, the means for determining whether validation of the hash identifier of the containerized application by the server was successful or unsuccessful includes means for sending, by the device toward a server, a request for validation of the hash identifier of the containerized application and means for receiving, by the device from the server, a validation response including an indication as to whether validation of the hash identifier of the containerized application by the server was successful or unsuccessful. In at least some example embodiments, the request for validation of the hash identifier of the containerized application is sent toward the server without a delay based on a determination that the hash identifier of the containerized application is not found in the list of hash identifiers of authorized containerized applications. In at least some example embodiments, the request for validation of the hash identifier of the containerized application is sent toward the server with a delay based on a determination that the hash identifier of the containerized application is found in the list of hash identifiers of authorized containerized applications. In at least some example embodiments, the means for determining the handling of the containerized application at the device includes means for determining, for a process for the containerized application initiated at the device, whether to permit the process to continue or to prevent the process from continuing. In at least some example embodiments, the process for the containerized application includes a download of the containerized application to the device or an execution of the containerized application at the device. In at least some example embodiments, the means for determining the handling of the containerized application at the device includes means for permitting a process for the containerized application to continue on the device based on a determination that the hash identifier of the containerized application is included in the list of hash identifiers of authorized containerized applications and a determination that validation of the hash identifier of the containerized application by the server was successful. In at least some example embodiments, the means for determining the handling of the containerized application at the device includes means for preventing a process for the containerized application from continuing on the device based on a determination that the hash identifier of the containerized application is not included in the list of hash identifiers of authorized containerized applications or a determination that validation of the hash identifier of the containerized application by the server was unsuccessful. In at least some example embodiments, the condition detected at the device includes initiation of execution of the containerized application on the device. In at least some example embodiments, the means for determining the handling of the containerized application at the device includes means for permitting execution of the containerized application to continue on the device based on a determination that the validation response includes an indication that validation of the hash identifier of the containerized application by the server was successful. In at least some example embodiments, the apparatus includes means for preventing execution of the containerized application from continuing on the device based on a determination that the validation response includes an indication that validation of the hash identifier of the containerized application by the server was unsuccessful. In at least some example embodiments, the apparatus includes means for computing, at the device in response to a download of the containerized application to the device, a hash of a complete tarball of the containerized application, means for determining, at the device, whether the hash of the complete tarball of the containerized application is included in the file, and means for determining, at the device based on whether the hash of the complete tarball of the containerized application is included in the file, handling of the download of the containerized application at the device. In at least some example embodiments, the means for determining the handling of the download of the containerized application at the device includes means for permitting the containerized application to remain on the device based on a determination that the hash of the complete tarball of the containerized application is included in the file. In at least some example embodiments, the means for determining the handling of the download of the containerized application at the device includes means for removing the containerized application from the device based on a determination that the hash of the complete tarball of the containerized application is not included in the file. In at least some example embodiments, the hash of the complete tarball of the containerized application is a Message-Digest (MD) Algorithm hash. In at least some example embodiments, the device includes at least one of a residential gateway, a WiFi access point, a fixed cellular access point, an optical network termination, a modem, a router, a firewall, a cable set-top box, a computer, a smartphone, or an Internet-of-Things device.

In at least some example embodiments, an apparatus includes at least one processor and at least one memory including computer program code, wherein the at least one memory and the computer program code are configured, with the at least one processor, to cause the apparatus to at least receive, from a device, a request to validate a hash identifier of a containerized application, wherein the request includes the hash identifier of the containerized application, determine, based on the hash identifier of the containerized application and a list of hash identifiers of a set of authorized containerized applications, whether execution of the containerized application on the device is authorized, and send, toward the device, an indication as to whether execution of the containerized application on the device is authorized. In at least some example embodiments, a non-transitory computer readable medium stores computer program code configured to cause an apparatus to at least receive, from a device, a request to validate a hash identifier of a containerized application, wherein the request includes the hash identifier of the containerized application, determine, based on the hash identifier of the containerized application and a list of hash identifiers of a set of authorized containerized applications, whether execution of the containerized application on the device is authorized, and send, toward the device, an indication as to whether execution of the containerized application on the device is authorized. In at least some example embodiments, a method includes receiving, from a device, a request to validate a hash identifier of a containerized application, wherein the request includes the hash identifier of the containerized application, determining, based on the hash identifier of the containerized application and a list of hash identifiers of a set of authorized containerized applications, whether execution of the containerized application on the device is authorized, and sending, toward the device, an indication as to whether execution of the containerized application on the device is authorized. In at least some example embodiments, an apparatus includes means for receiving, from a device, a request to validate a hash identifier of a containerized application, wherein the request includes the hash identifier of the containerized application, means for determining, based on the hash identifier of the containerized application and a list of hash identifiers of a set of authorized containerized applications, whether execution of the containerized application on the device is authorized, and means for sending, toward the device, an indication as to whether execution of the containerized application on the device is authorized.

In at least some example embodiments, an apparatus includes at least one processor and at least one memory including computer program code, wherein the at least one memory and the computer program code are configured, with the at least one processor, to cause the apparatus to at least receive, by a device, a validation file and a validation signature associated with the validation file, wherein the validation file includes a list of hash identifiers of authorized containerized applications, validate, at the device, based on the validation signature and a public key available on the device, the validation file, and determine, at the device based on the list of hash identifiers of authorized containerized applications, handling of a containerized application at the device. In at least some example embodiments, a non-transitory computer readable medium stores computer program code configured to cause an apparatus to at least receive, by a device, a validation file and a validation signature associated with the validation file, wherein the validation file includes a list of hash identifiers of authorized containerized applications, validate, at the device, based on the validation signature and a public key available on the device, the validation file, and determine, at the device based on the list of hash identifiers of authorized containerized applications, handling of a containerized application at the device. In at least some example embodiments, a method includes receiving, by a device, a validation file and a validation signature associated with the validation file, wherein the validation file includes a list of hash identifiers of authorized containerized applications, validating, at the device, based on the validation signature and a public key available on the device, the validation file, and determining, at the device based on the list of hash identifiers of authorized containerized applications, handling of a containerized application at the device. In at least some example embodiments, an apparatus includes means for receiving, by a device, a validation file and a validation signature associated with the validation file, wherein the validation file includes a list of hash identifiers of authorized containerized applications, means for validating, at the device, based on the validation signature and a public key available on the device, the validation file, and means for determining, at the device based on the list of hash identifiers of authorized containerized applications, handling of a containerized application at the device.

BRIEF DESCRIPTION OF THE DRAWINGS

The teachings herein can be readily understood by considering the following detailed description in conjunction with the accompanying drawings, in which.

To facilitate understanding, identical reference numerals have been used herein, wherever possible, in order to designate identical elements that are common among the various figures.

DETAILED DESCRIPTION

Various example embodiments for supporting security for containerized applications are presented herein. Various example embodiments for supporting security for containerized applications may be configured to support security for containerized applications that are deployed to customer devices (e.g., customer premises equipment (CPE), customer endpoint devices, or the like). Various example embodiments for supporting security for containerized applications that are deployed to customer devices may be configured to properly secure and validate containerized applications that are deployed to customer devices. Various example embodiments for supporting security for containerized applications that are deployed to customer devices may be configured to secure and validate containerized applications that are deployed to customer devices based on a framework configured to monitor and secure download of containerized applications to protect against the download of non-approved or malicious containers and to monitor and secure the run-time execution of containerized applications in various types of execution environments (e.g., Open Container Initiative (OCI), Linux (LXC), Docker, or the like), thereby providing a capability to verify and validate that the containerized applications are in fact approved and authorized by the service provider and that the customer device has not been compromised. Various example embodiments for supporting security for containerized applications may be configured to support security for containerized applications within various environments (e.g., communication service provider (CSP) environments, enterprise environments, information technology (IT) environments, or the like, as well as various combinations thereof). Various example embodiments for supporting security for containerized applications may be configured to support security for containerized applications within various environments which may utilize various types of software management capabilities, such as environments using Broadband Forum standards, environments using Automatic Configuration Server (ACS) capabilities, or the like, as well as various combinations thereof. It will be appreciated that these and various other example embodiments and advantages or potential advantages of supporting security for containerized applications may be further understood by way of reference to the various figures, which are discussed further below.

Figure 1:
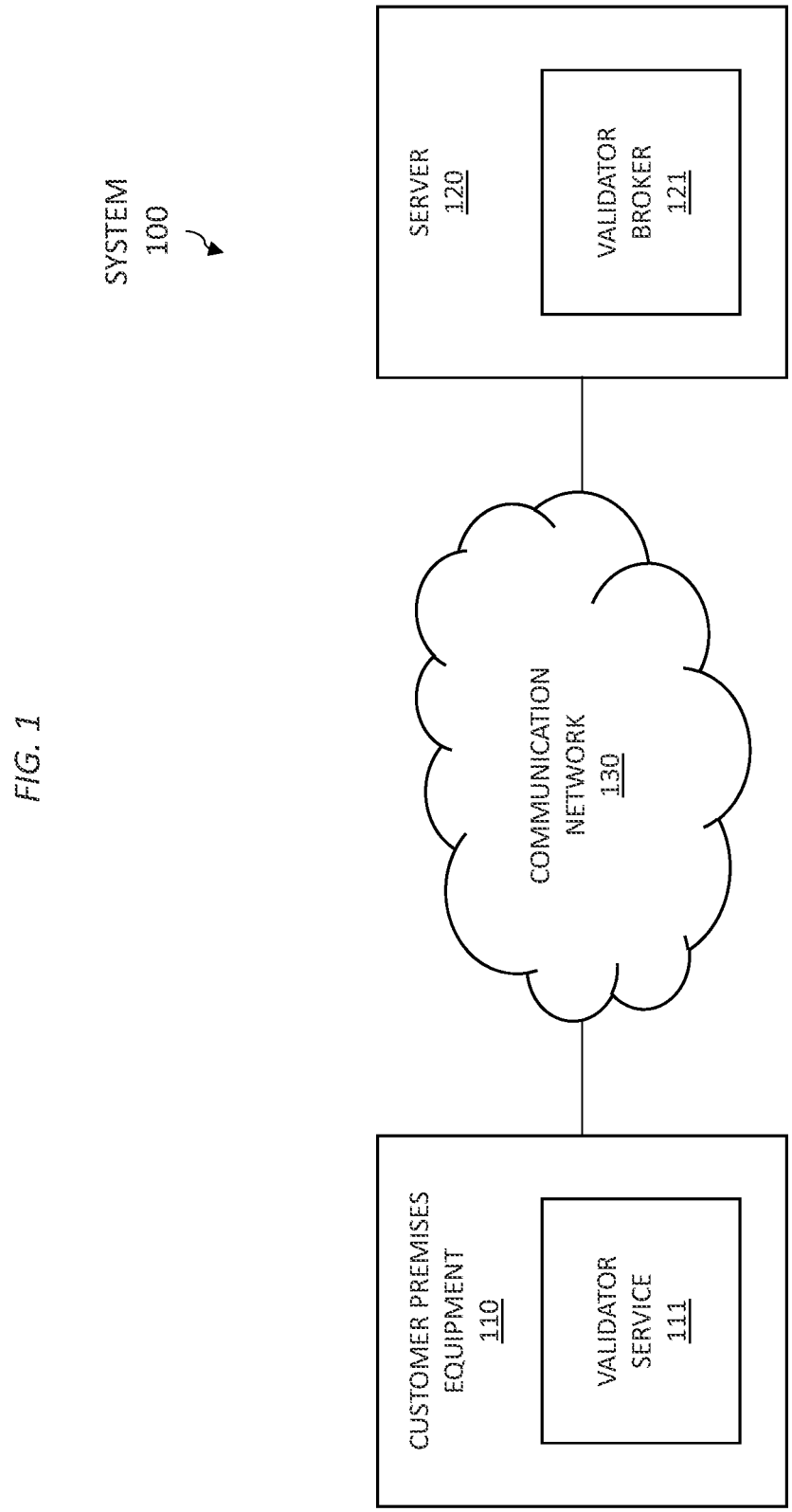
FIG. 1 depicts an example embodiment of a system configured to support security for containerized applications.

FIG. 1 depicts an example embodiment of a system configured to support security for containerized applications.

The system 100 includes a customer premises equipment (CPE) 110 and a server 120 interconnected via a communication network 130. The system 100 is configured to support management of the CPE 110 by the server 120 via the communication network 130, including device management for management of the CPE 110, software management for management of software (e.g., containerized applications or other types of software) on the CPE 110, or the like, as well as various combinations thereof. The system 100 may be configured to support software management which may include support for various software management functions, support for software management based on various software management capabilities, or the like, as well as various combinations thereof. The system 100 may be configured to support various other software management functions.

The CPE 110 may be any type of customer premises equipment which may be managed remotely by a server such as the server 120. For example, the CPE 110 may be a residential gateway, a WiFi access point, a 5G fixed wireless access point, an optical network termination (ONT), a modem, a router, a firewall, a cable set-top box, a computer, a voice over Internet Protocol (VoIP) device, a smartphone, an Internet-of-Things (IoT) device, or the like, as well as various combinations thereof. In other words, the CPE 110 may be an endpoint communication device at the customer premises or an intermediate communication device at the customer premises that is configured to serve one or more other endpoint communication devices at the customer premises. It will be appreciated that, although various example embodiments presented herein are primarily presented within the context of remote management of CPEs, various example embodiments presented herein may be used for remote management of other types of devices in other types of contexts (e.g., mobile devices such as user equipments (UEs), autonomous vehicles, and so forth, at least some of which may not necessarily be associated, or at least permanently associated, with any customer premises).

The server 120 may be any type of server which may support remote management of CPEs such as the CPE 110 (as well as various other CPEs which have been omitted for purposes of clarity). For example, the server 120 may support remote device management for CPEs such as the CPE 110. For example, the server 120 may support remote software management for CPEs such as the CPE 110. For example, the server 120 may be a server configured to support device management for CPEs based on various Broadband Forum standards for device management (e.g., TR-069, TR-369, TR-157, TR-181, or the like, as well as various combinations thereof). For example, the server 120 may be an ACS server configured to support device management for CPEs based on automatic configuration services. It will be appreciated that, although various example embodiments presented herein are primarily presented within the context of remote management of devices by a server, various example embodiments presented herein may be used for remote management of devices by various other types of elements (e.g., management systems, controllers, or the like, as well as various combinations thereof.

The communication network 130 may be any type of communication network which may support communications for remote management of CPEs (such as the CPE 110) by servers (such as the server 120). For example, the communication network 130 may include a communication service provider (CSP) network, an enterprise network, or the like, as well as various combinations thereof. For example, the communication network 130 may include a wireline network (e.g., an Ethernet network, an Internet Protocol (IP) network, a cable network, an optical network, and so forth), a wireless network (e.g., a cellular network such as a Long Term Evolution (LTE) network or Fifth Generation (5G) network), a WiFi network, and so forth), or the like, as well as various combinations thereof. It will be appreciated that, although various example embodiments presented herein are primarily presented within the context of remote management of devices based on communications via various types of communications networks, various example embodiments presented herein may be used for remote management of devices based on communications via various other types of communication networks.

The system 100 may be configured to support software management which may include support for various software management functions. For example, the system 100 may be configured to enable a service provider of the server 120 to perform various software management functions for the CPE 110. For example, the system 100 may be configured to enable the service provider of the server 120 to perform software management functions for the CPE 110 that may include software management functions such as requesting a download of a software module to the CPE 110 for installation on the CPE 110, starting/stopping a downloaded software module on the CPE 110, updating a software module on the CPE 110, uninstalling a software module on the CPE 110, or the like, as well as various combinations thereof. It will be appreciated that the system 100 may be configured to enable the service provider of the server 120 to perform various other software management functions for the CPE 110.

The system 100 may be configured to support software management based on various software management capabilities. For example, the system 100 may be configured to support software management based on various device and application management capabilities configured to support device and application management for CPEs. For example, the system 100 may be configured to support software management based on various Broadband Forum standards configured to support software module management on CPEs (e.g., TR-069, TR-369, TR-157, TR-181, or the like, as well as various combinations thereof). For example, the system 100 may be configured to support software management based on various Broadband Forum standards which are configured to support messaging for providing basic lifecycle management of containerized applications that are part of various types of execution environments (e.g., OCI, LXC, Docker, or the like). For example, the system 100 may be configured to support software management based on Automatic Configuration Server (ACS) capabilities (including TR-069). It will be appreciated that the system 100 may be configured to support software management based on various other device and application management capabilities configured to support device and application management for CPEs.

The system 100 may be configured to support security within the context of software management within the system 100. The system 100 may be configured to support security for management of containerized applications. In at least some example embodiments, a containerized application is an application that is encapsulated within a container. For example, a container may encapsulate an application as a single executable software package that bundles the application code with various related elements which may be used to run the application code (e.g., elements such as configuration files, libraries, dependencies, or the like, as well as various combinations thereof). It will be appreciated that the format of software package, when containerized, may take various forms (e.g., a simple tarball (compressed or uncompressed), an industry standard container format (e.g., OCI, LXC, Docker, etc.), or the like). It will be appreciated that the containerized application may be deployed to a CPE by installing it from a software package into an existing, empty container on the CPE, installing it from a pre-packaged container, or the like.

The system 100 may be configured to support security for management of containerized applications based on a validator service 111 provided on the CPE 110 and validator broker 121 provided on the server 120. The validator service 111 is configured to provide various functions for supporting security for containerized applications on CPE 110. The validator service 111 may be a daemon service or other suitable type of service which may operate on the CPE 110. The validator broker 121 is configured to provide various functions for supporting security for containerized applications on CPE 110. The validator broker 121 may be hosted and secured by the communication service provider or any other suitable entity. As discussed further below, the validator service 111 and the validator broker 121 may cooperate to support security for containerized applications for the CPE 110.

The validator service 111 and the validator broker 121 may be configured to support security for containerized applications by supporting validation checks at boot-up of the CPE 110, download of containerized applications to the CPE 110, and runtime execution of the containerized applications on the CPE 110.

The validator service 111 and the validator broker 121 may be configured to support authentication of the validator service 111 by the validator broker 121. The authentication of the validator service 111 by the validator broker 121 may be performed at various times, such as on boot-up or reboot, in conjunction with downloading of containerized applications, in conjunction with requests for execution of containerized applications, or the like. The authentication of the validator service 111 by the validator broker 121 may be performed in various ways. For example, the authentication of the validator service 111 by the validator broker 121 may be based on use of the IP address of the validator broker 121 by the validator service 111 when interacting with the validator broker 121. For example, the authentication of the validator service 111 by the validator broker 121 may be based on use of authentication credentials (e.g., login and password). It will be appreciated that the validator service 111 and the validator broker 121 may be configured to support authentication of the validator service 111 by the validator broker 121 in various other ways.

The validator service 111 and the validator broker 121 may be configured to support security for containerized applications by supporting a validation check at boot-up (or reboot) of the CPE 110.

The validator service 111, upon boot-up of the CPE 110, contacts the validator broker 121 and downloads a Container_SHA_IDS file which may be used by the validator service 111 for validation of containerized applications on the CPE 110 and a validation signature which may be used by the validator service 111 to validate the Container_SHA_IDS file (e.g., validating the integrity of the contents of the Container_SHA_IDS file and validating the authenticity of the source of the Container_SHA_IDS file) which will be used by the validator service for validation of containerized applications on the CPE 110. The Container_SHA_IDS file is a file that includes, for a set of authorized containerized applications, a list of Secure Hash Algorithm—256 (SHA-256) IDs (or IDs based on other SHA hashes or other suitable types of hashes) of the authorized containerized applications and Message-Digest 5 (MD5) hashes (or hashes based on other MD hashes or other suitable types of hashes) of the complete tarballs of the authorized containerized application (including the scripts, etc.). The validation signature is a signature that is generated based on a private key and which may be validated by the validator service 111 based on a public key available to the validator service 111. The validator service 111 may attempt to contact the validator broker 121 and download the Container_SHA_IDS file using an encrypted session (e.g., an encrypted Hypertext Transfer Protocol Secure (HTTPS) session or other suitable type of encrypted session).

The validator broker 121 allows the communication service provider to support validation of containerized applications by the validator service 111 on the CPE 110. The validator broker 121 allows the communication service provider to input the list of pre-approved SHA-256 ID values of the approved containerized applications and the MD5 hashes of the complete tarballs of the approved containerized applications to form the Container_SHA_IDS file. The approved SHA-256 ID values programmed in the list of pre-approved SHA-256 ID values for approved containerized applications may be provided by the creators of the containerized applications, using the same compute methods used by the CPE 110, before the containerized applications are packaged in the tarballs for distribution to the CPE 110 (e.g., over TR157 by the ACS). The validator broker 121 allows the communication service provider to create the validation signature for the Container_SHA_IDS file based on a private key (which may remain known only to the communication service provider for security purposes). The validator broker 121 distributes the Container_SHA_IDS file and the associated validation signature to the CPEs (including CPE 110). The validator broker 121 may distribute the Container_SHA_IDS file and validation signature to the CPEs using secure channels (e.g., HTTPS sessions or the like).

The validator service 111 uses a public key of a public key file, which is referred to herein as the ContainerSHAPublicKey file, to validate the Container_SHA_IDS file from the validator broker 121. The validator service 111 validates the Container_SHA_IDS file from the validator broker 121 based on use of the ContainerSHAPublicKey file to validate the validation signature provided by the validator broker 121 to the validator service 111 with the Container_SHA_IDS file. The ContainerSHAPublicKey file may be integrated as part of the base firmware image of the CPE 110 or implemented on the CPE 110 in any other suitable manner. The public key specified in the ContainerSHAPublicKey file may be assigned by the CPE vendor of the CPE 110 and may be unique to each service provider. The successful validation of the validation signature based on the ContainerSHAPublicKey file proves to the validator service 111 that the contents of the Container_SHA_IDS file have not been altered (i.e., validating the integrity of the contents of the Container_SHA_IDS file) and that the Container_SHA_IDS file was created by a trusted source such as the validator broker 121 or some other entity of the communication service provider (i.e., validating the authenticity of the Container_SHA_IDS file).

The validator service 111 and the validator broker 121 may be configured to support security for containerized applications by supporting a validation check at boot-up (or reboot) of the CPE 110 using various other security capabilities.

The validator service 111 and the validator broker 121 may be configured to support security for a containerized application by supporting a validation check at download of the containerized application to the CPE 110.

The validator service 111, upon download of a containerized application to the CPE 110, may perform a validation for the containerized application. The download of the containerized application to the CPE 110 may be an initial download of the containerized application (e.g., where the containerized application is a new containerized application for the CPE 110), a download of an updated version of the containerized application (e.g., where the containerized application exists on the CPE 110 and is being updated), or the like. The download of the containerized application to the CPE 110 may be based on TR-157 or any other suitable software download capabilities.

The validator service 111 may validate the downloaded containerized application by verifying the MD5 hash of the complete tarball of the downloaded containerized application (including the scripts, etc.) using the Container_SHA_IDS file information. The validator service 111 may verify the MD5 hash of the complete tarball of the downloaded containerized application by computing an MD-5 hash over the tarball of the downloaded containerized application to obtain an MD-5 hash of the tarball of the downloaded containerized application and verifying that the MD-5 hash of the tarball of the downloaded containerized application is included in Container_SHA_IDS file on the CPE 110. If the MD-5 hash of the tarball of the downloaded containerized application is not included in Container_SHA_IDS file on the CPE 110, then the downloaded containerized application is not validated and validator service 111 may delete the downloaded containerized application from the file system of the CPE 110. If the MD-5 hash of the tarball of the downloaded containerized application is included in Container_SHA_IDS file on the CPE 110, then the downloaded containerized application may be considered to be validated, or one or more additional validations may be performed before the downloaded containerized application is considered to be validated.

The validator service 111 may validate the downloaded containerized application by SHA-256 ID of the downloaded containerized application using the Container_SHA_IDS file information. The validator service 111 may verify the SHA-256 ID of the downloaded containerized application by computing an SHA-256 hash against the downloaded containerized application to obtain an SHA-256 ID of the downloaded containerized application and verifying that the SHA-256 ID of the downloaded containerized application is included in the list of SHA-256 IDs of authorized containerized applications in the Container_SHA_IDS file on the CPE 110. If the SHA-256 ID of the downloaded containerized application is not included in the list of SHA-256 IDs of authorized containerized applications in the Container_SHA_IDS file on the CPE 110, then the downloaded containerized application is not validated and validator service 111 may delete the downloaded containerized application from the file system of the CPE 110. If the SHA-256 ID of the downloaded containerized application is included in the list of SHA-256 IDs of authorized containerized applications included in the Container_SHA_IDS file on the CPE 110, then the downloaded containerized application may be considered to be validated, or one or more additional validations may be performed before the downloaded containerized application is considered to be validated.

It will be appreciated that, although primarily described as being used individually, validation of the downloaded containerized application may be based on both verification of the MD5 hash of the complete tarball of the downloaded containerized application and verification of SHA-256 ID of the downloaded containerized application.

The validator service 111 and the validator broker 121 may be configured to support security for a containerized application by supporting a validation check at download of the containerized application to the CPE 110 using various other security capabilities.

The validator service 111 and the validator broker 121 may be configured to support security for a containerized application by supporting a validation check at runtime execution of the containerized application on the CPE 110.

The validator service 111 initiates security functions to provide security for a containerized application based on detection of a "container start" condition. The validator service 111 may detect a "container start" condition by monitoring messaging requests from the server 120 for a "container start" condition (e.g., by listening to TR-157 messaging requests coming from the server 120 where the server 120 is operating as a TR-069 ACS). The validator service 111, based on detection of a "container start" condition for a containerized application, performs the following security functions for the containerized application for which the "container start" condition is detected.

The validator service 111 validates the requested containerized application locally at the CPE 110. The validator service 111 computes an SHA-256 hash against the requested containerized application for which the "container start" condition is detected to obtain an SHA ID of the requested containerized application for which the "container start" condition is detected. The validator service 111 checks the SHA ID of the requested containerized application against the list of SHA IDs in the Container_SHA_IDS file on the CPE 110 to validate the SHA ID of the requested containerized application.

The validator service 111 requests that the validator broker 121 also validate the requested containerized application at the server 120. The validator service 111 sends the SHA ID of the requested containerized application to the validator broker 121 requesting that the validator broker 121 also validate the SHA ID of the requested containerized application.

The validator service 111 may send the SHA ID of the requested containerized application to the validator broker 121 in various ways. The validator service 111 may send the SHA ID of the requested containerized application to the validator broker 121 using a web-service call. The validator service 111 may send the SHA ID of the requested containerized application based on an IP address of the validator broker 121, which may be configurable via a TR-069/TR-369 value (e.g., "InternetGatewayDevice.DeviceInfo.X_ABC-COM_ServiceManage.Valid8r.HostIP" or the like). The manner in which the validator service 111 sends the SHA ID of the requested containerized application to the validator broker 121, as discussed further below, may depend on whether the SHA ID of the requested containerized application was found in the list of SHA IDs in the Container_SHA_IDS file on the CPE 110.

For example, in the case in which the SHA ID of the requested containerized application was found in the list of SHA IDs in the Container_SHA_IDS file on the CPE 110, the request from the validator service 111 to the validator broker 121 may be sent with a delay. The request from the validator service 111 to the validator broker 121 may be delayed by a predetermined amount, may be randomly delayed algorithmically between a range of delay times (e.g., between 1 and 5 seconds, between 2 and 7 seconds, or the like), and so forth. It is noted that randomly delaying the request from the validator service 111 to the validator broker 121 may be used to prevent accidental DoS in the case of massive "reboots" due to power cycles, automated reboots, and so forth). It will be appreciated that, although primarily described with respect to example embodiments in which the request from the validator service 111 to the validator broker 121 is delayed when the SHA ID of the requested containerized application was found in the list of SHA IDs in the Container_SHA_IDS file on the CPE 110, in at least some example embodiments the request from the validator service 111 to the validator broker 121 may be sent without delay (e.g., sent immediately) when the SHA ID of the requested containerized application was found in the list of SHA IDs in the Container_SHA_IDS file on the CPE 110.

For example, in the case in which the SHA ID of the requested containerized application was not found in the list of SHA IDs in the Container_SHA_IDS file on the CPE 110, the request from the validator service 111 to the validator broker 121 may be sent without a delay (e.g., sent immediately). It will be appreciated that, although primarily described with respect to example embodiments in which the request from the validator service 111 to the validator broker 121 is not delayed when the SHA ID of the requested containerized application was not found in the list of SHA IDs in the Container_SHA_IDS file on the CPE 110, in at least some example embodiments the request from the validator service 111 to the validator broker 121 may be sent with a delay when the SHA ID of the requested containerized application was not found in the list of SHA IDs in the Container_SHA_IDS file on the CPE 110.

The validator broker 121, upon receiving a validation request from the validator service 111 that includes the SHA-256 ID of the containerized application of the request, attempts to validate the containerized application for the validator service 111 and sends an associated validation response to the validator service 111 based on whether the validator broker 121 is able to validate the containerized application for the validator service 111.

The validator broker 121, upon receiving a validation request from the validator service 111 that includes the SHA-256 ID of the containerized application of the request, attempts to validate the containerized application for the validator service 111 by checking the SHA ID of the requested containerized application against a list of pre-approved SHA-256 ID values for approved containerized applications on the server 120. The list of pre-approved SHA-256 ID values for approved containerized applications, as indicated above, may be programmed on the server 120 by the communication service provider and provided from the server 120 to the CPE 110 in the Container_SHA_IDS file.

The validator broker 121, based on whether the SHA-256 ID of the containerized application of the request is found in the list of pre-approved SHA-256 ID values for approved containerized applications, sends a validation response to the validator service 111 where the validation response is indicative as to whether the validation of the requested containerized application is successful (Approved) or unsuccessful (Declined). The validator broker 121 may send the validation response for the requested containerized application to the validator service 111 using a web-service response.

The validator service 111 receives the validation response for the requested containerized application from the validator broker 121. The validator service 111, upon receiving the validation response from the validator broker 121, determines handling of the container start condition for the requested containerized application based on the validation response from the validator broker 121.

The validator service 111, upon receiving a validation response indicative that the validation of the requested containerized application by the validator broker 121 is successful (Approved), may permit further execution of the requested containerized application. The validator service 111 may permit further execution of the requested containerized application by taking no further action with respect to the requested containerized application (i.e., the containerized application is allowed to continue execution).

The validator service 111, upon receiving a validation response indicative that the validation of the requested containerized application by the validator broker 121 is unsuccessful (Declined), may prevent further execution of the requested containerized application. The validator service 111 may prevent further execution of the requested containerized application by forcefully terminating the requested containerized application. The validator service 111 also may delete the containerized application from the file system of the CPE 110.

The validator service 111 may not be able to have the validator broker 121 validate the containerized application and may determine handling of the container start condition for the requested containerized application based on the validator service 111 being unable to have the validator broker 121 validate the containerized application.

For example, the validator service 111 may not be able to have the validator broker 121 validate the containerized application for a number of reasons, such as where the validator service 111 is unable to contact the validator broker 121 (or unable to contact the validator broker 121 for a particular length of time, such as 2 seconds, 5 seconds, or the like), the validator service 111 is able to contact the validator broker 121 but does not receive a validation response from the validator broker 121 (or does not receive a validation response from the validator broker 121 within a timeout period, such as 3 seconds, 5 seconds, or the like), or the like, as well as various combinations thereof.

For example, if the SHA ID of the requested containerized application is found by the validator service 111 in the Container_SHA_IDS file on the CPE 110, but the validator service 111 is unable to have the validator broker 121 validate the containerized application, the validator service 111 may allow the containerized application to execute or may prevent further execution of the requested containerized application.

For example, if the SHA ID of the requested containerized application is not found by the validator service 111 in the Container_SHA_IDS file on the CPE 110, and the validator service 111 is unable to have the validator broker 121 validate the containerized application, the validator service 111 may prevent further execution of the requested containerized application.

The validator service 111, in response to a failure to have the validator broker 121 validate the containerized application (e.g., due to a failed validation request in which the validator service 111 is unable to contact the validator broker 121 or due to a failure to receive a validation response from the validator broker 121), may perform one or more connection retries to the validator broker 121 in order to attempt to have the validator broker 121 validate the containerized application. The connection retries may be initiated after detection of each failure or may be initiated after a delay after detection of each failure. It will be appreciated various aspects of the connection retries may be configurable (e.g., the number of retries, the delay between successive retries, or the like, as well as various combinations thereof).

The validator service 111 and the validator broker 121 may be configured to support security for a containerized application by supporting a validation check at runtime execution of the containerized application on the CPE 110 using various other security capabilities.

The validator service 111 and the validator broker 121 may be configured to support updates to the Container_SHA_IDS file on the server 120. The validator service 111 may periodically check with the validator broker 121 to determine if the Container_SHA_IDS file on the server 120 has changed. The validator service 111 may periodically check with the validator broker 121 using a fixed period (e.g., once each hour, once every two hours, or the like), using an algorithmically randomized period, or the like, as well as various combinations thereof. It will be appreciated that, where a periodic check is used, a minimum delay may be imposed between provisioning of new IDs of new containerized applications in the Container_SHA_IDS file on the server 120 and publishing of the new containerized applications to the CPE 110 (and other CPEs). It will be further appreciated that, even assuming that such a minimum delay could not or was not imposed, false positive outages still may be prevented based on extra messaging between the CPE 110 and the validator broker 121.

The validator service 111 and the validator broker 121 may support logging capabilities for logging various aspects of security functions performed for securing containerized applications. For example, the validator broker 121 may log validation operations performed for containerized applications supported by the validator broker 121 (e.g., receipt of validation requests from validator services such as validator service 111, results of validation of requested containerized applications in terms of whether validation of the requested containerized applications is successful or unsuccessful, and so forth). For example, the validator service 111 may log information related to requests for validation of containerized applications sent to the validator broker 121 (e.g., approved validations where the validator service 111 receives a successful response from the validator broker 121, declined validations where the validator service 111 receives an unsuccessful response from the validator broker 121, failed validations where the validator service 111 is unable to contact the validator broker 121 or receives a response timeout failure while attempting to contact the validator broker 121, and so forth). It will be appreciated that various aspects of security functions performed for securing containerized applications may be logged by the validator service 111 and/or the validator broker 121.

In this manner, the validator service 111 and the validator broker 121 may be configured to provide a multi-layer security framework by: (1) providing pre-runtime validation of the containerized application at both boot-up/re-boot of the CPE 110 as well as at the download time (e.g., the TR-157 download time) prior to executing the containerized application, (2) providing runtime validation at the execution of the containerized application, and (3) providing an additional failsafe mechanism that, even if the containerized application is found valid based on the Container_SHA_IDS file cached on the CPE 110, an additional verification is done in real time by the validator service 111 with the validator broker 121.

It will be appreciated that, although primarily presented with respect to various example embodiments in which security is provided for the containerized application under specific types of conditions (e.g., boot-up/re-boot, download, execution, and so forth), security may be provided for the containerized application under various other types of conditions. For example, under normal operating conditions, containerized applications generally are only expected to be executed under two specific conditions (e.g., at boot-up/reboot of the CPE 110 or after a TR-157 initiated download of a new or updated containerized application); however, there may be exceptions (e.g., where the containerized application is stopped manually without an intent to update it or uninstall it) and the containerized application may still be secured during such exceptions. It will be appreciated that security may be provided for containerized applications under various other types of conditions.

It will be appreciated that the validator service 111 and/or the validator broker 121 may support various other functions for supporting security for management of containerized applications.

Figure 2:
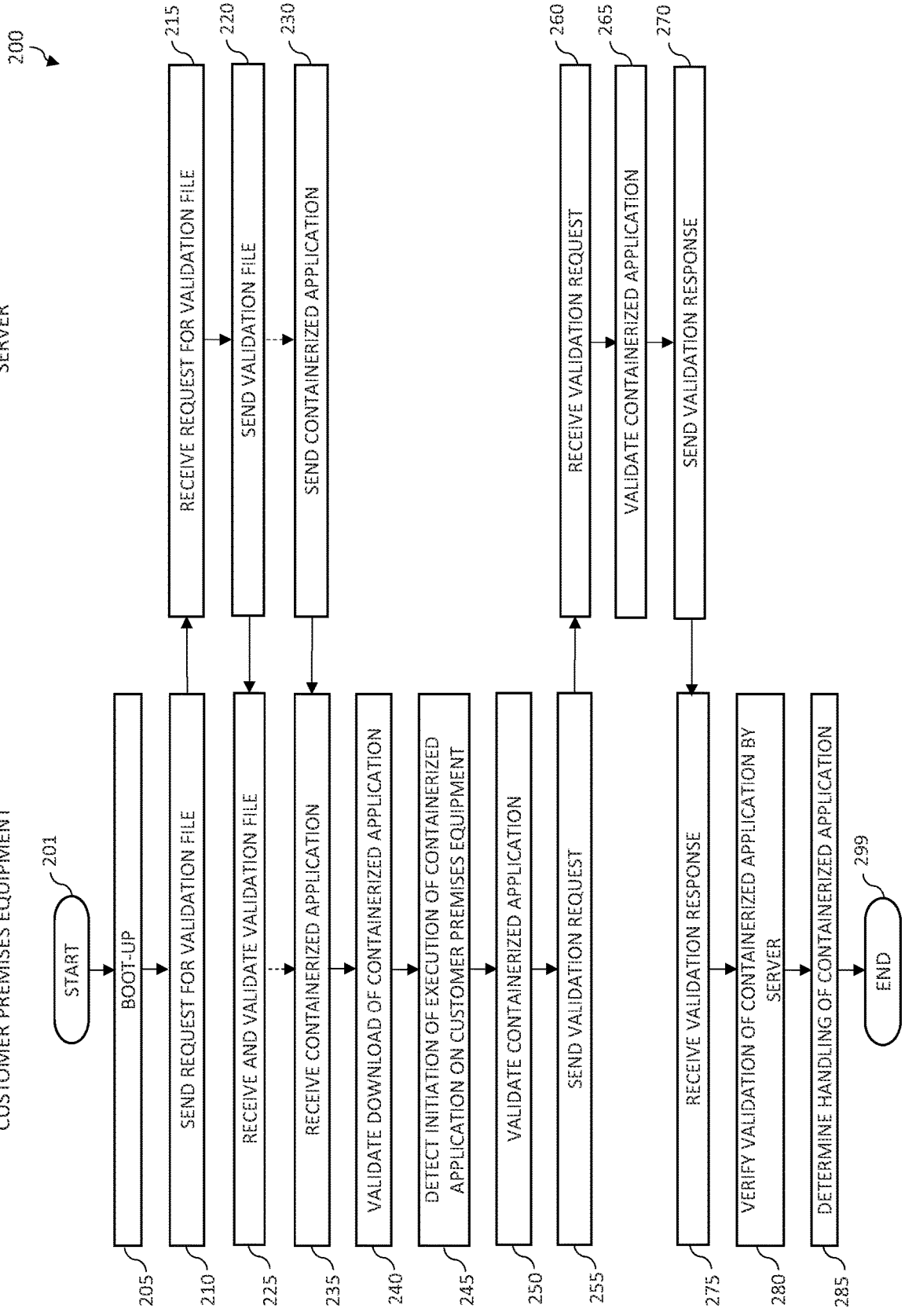
FIG. 2 depicts an example embodiment of a method for use by a customer premises equipment and a server to support security for a containerized application.

FIG. 2 depicts an example embodiment of a method for use by a customer premises equipment and a server to support security for a containerized application. It will be appreciated that, although primarily presented herein as being performed serially, at least a portion of the functions of the method 200 may be performed contemporaneously or in a different order than as presented in FIG. 2.

At block 201, the method 200 begins.

At block 205, the customer premises equipment boots up. This may be an initial boot-up of the customer premises equipment or a re-boot of the customer premises equipment. The customer premises equipment is already storing a public key (e.g., as part of a base firmware image).

At blocks 210-225, the customer premises equipment obtains a validation file and associated validation signature. At block 210, the customer premises equipment sends a request for the validation file toward the server. At block 215, the server receives the request for the validation file from the customer premises equipment. At block 220, the server sends the validation file and associated validation signature toward the customer premises equipment. At block 225, the customer premises equipment receives the validation file and associated validation signature from the server and validates the validation file. The validation file and associated validation signature may be communicated from the server to the customer premises equipment through an encrypted channel (e.g., using HTTPS or other suitable encrypted channels). The validation file includes a list of hash identifiers of authorized containerized applications (e.g., SHA256 IDs or identifiers based on other SHA hashes or other suitable types of hashes) and hashes of the tarballs the authorized containerized applications (e.g., MD5 hashes or a hashes based on other types of Message-Digest hashes or other suitable types of hashes). The customer premises equipment may validate the validation file (e.g., validating the integrity of the contents of the validation file and the authenticity of the source of the validation file) based on the associated validation signature and the public key.

At blocks 230-235, the customer premises equipment obtains the containerized application. At block 230, the server sends the containerized application to the customer premises equipment. At block 235, the customer premises equipment receives the containerized application from the server. It will be appreciated that the containerized application may be provided to the customer premises equipment based on a push by the server (as illustrated in FIG. 2) or in response to a request from the customer premises equipment (omitted from FIG. 2 for purposes of clarity).

At block 240, the customer premises equipment validates the download of the containerized application. The customer premises equipment may validate the download of the containerized application based on the validation file (e.g., based on matching of a hash of the tarball of the containerized application to information in the validation file, based on matching of a hash identifier that is based on a hash of the containerized application to information in the validation file, or the like, as well as various combinations thereof). In the method 200 of FIG. 2, it is assumed that the download of the containerized application is successfully validated such that the customer premises may proceed to initiate execution of the containerized application.

At block 245, the customer premises equipment detects initiation of execution of the containerized application at the customer premises equipment.

At blocks 250-280, execution of the containerized application at the customer premises equipment is validated.

At block 250, the customer premises equipment validates the containerized application at the customer premises equipment. The customer premises equipment may validate the containerized application by computing a hash of the containerized application to obtain a hash identifier of the containerized application and verifying that the hash of the containerized application is included in a list of hash identifiers of authorized containerized applications that is included in the validation file.

At blocks 255-280, the customer premises equipment verifies validation of the containerized application by the server.

At block 255, the customer premises equipment sends a request for validation of the containerized application to the server. At block 260, the server receives the request for validation of the containerized application from the customer premises equipment. The request for validation of the containerized application may include a hash identifier of the containerized application computed by the customer premises equipment.

At block 265, the server validates the containerized application. The server may validate the containerized application by determining whether a hash identifier of the containerized application provided by the customer premises equipment in the request for validation of the containerized application is included in a list of hash identifiers of authorized containerized applications that is included in the validation file.

At block 270, the server sends a validation response for the containerized application to the customer premises equipment. At block 275, the customer premises equipment receives the validation response for the containerized application from the server. The validation response for the containerized application includes an indication as to whether validation of the containerized application by the server was successful or unsuccessful.

At block 280, the customer premises equipment verifies the validation of the containerized application by the server. The customer premises equipment may verify the validation of the containerized application by the server by determining whether the validation response for the containerized application includes an indication as to whether validation of the containerized application by the server was successful or unsuccessful.

At block 285, the customer premises equipment determines handling of the containerized application based on the validation of the containerized application at the customer premises equipment (in block 250) and the verification at the customer premises equipment of the validation of the containerized application by the server (in block 280). The customer premises equipment may determine that execution of the containerized application should be permitted to continue (where the containerized application is successfully validated by both the customer premises equipment and the server) or that execution of the containerized application should be prevented from continuing (where validation of the containerized application by either or both of the customer premises equipment and the server is unsuccessful).

At block 299, the method 200 ends.

It will be appreciated that various other features and functions presented herein may be incorporated within the context of the method 200 of FIG. 2.

Figure 3:
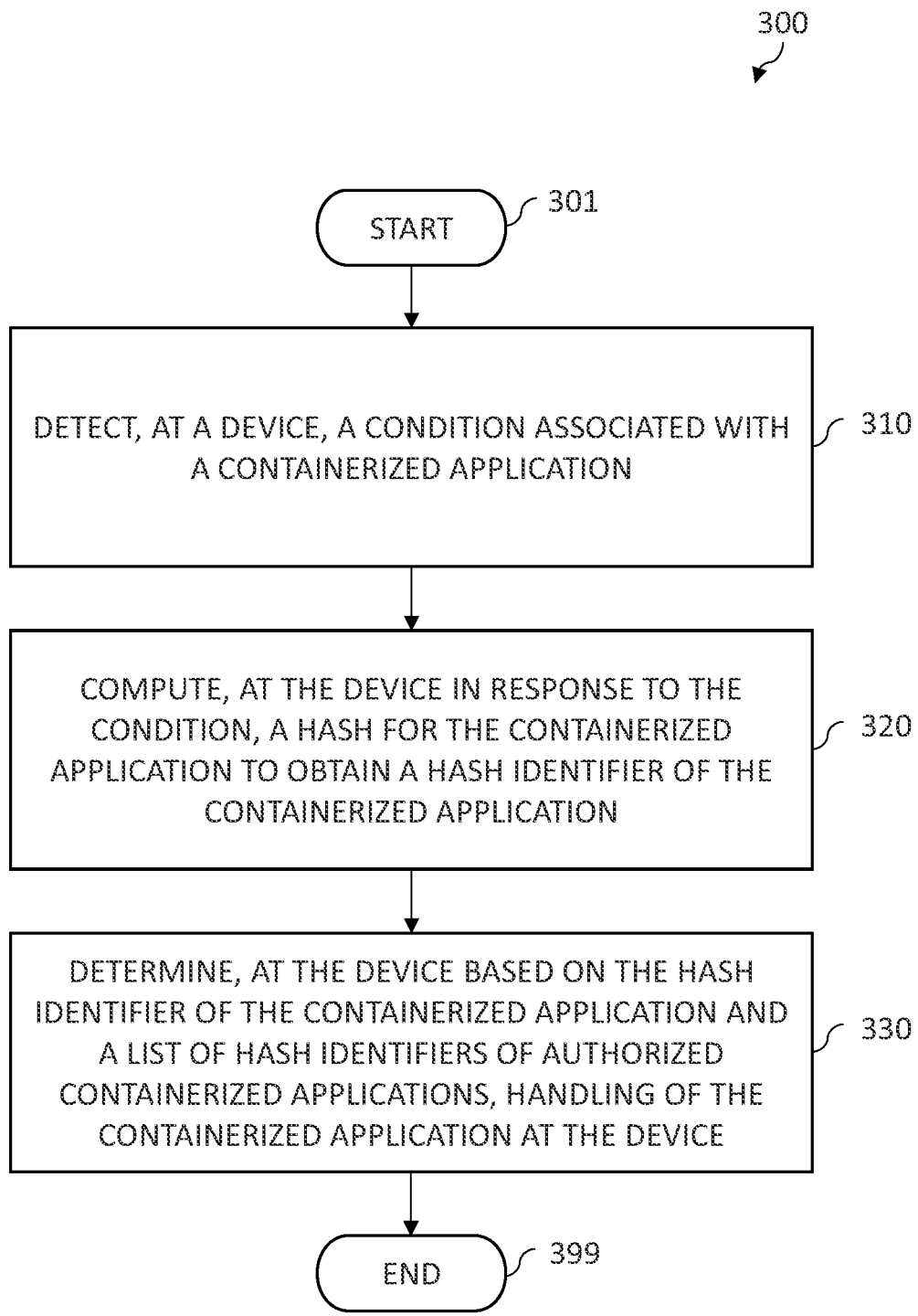
FIG. 3 depicts an example embodiment of a method for use by a customer premises equipment to support security for a containerized application.

FIG. 3 depicts an example embodiment of a method for use by a device (e.g., a customer premises equipment or other device) to support security for a containerized application. It will be appreciated that, although primarily presented herein as being performed serially, at least a portion of the functions of the method 300 may be performed contemporaneously or in a different order than as presented in FIG. 3. At block 301, the method 300 begins. At block 310, detect, at a device, a condition associated with a containerized application. At block 320, compute, at the device in response to the condition, a hash of the containerized application to obtain a hash identifier of the containerized application. At block 330, determine, at the device based on the hash identifier of the containerized application and a list of hash identifiers of authorized containerized applications, handling of the containerized application at the device. At block 399, the method 300 ends. The condition may include at least one of a booting or rebooting of the device, a download of the containerized application to the device, or a request to start the containerized application on the device. The list of hash identifiers of authorized containerized applications may be obtained at the device by receiving a validation file including the list of hash identifiers of authorized containerized applications and validating, based on a validation signature received with the validation file and based on a public key, the validation file (e.g., validating the integrity of the contents of the validation file, including the list of hash identifiers of authorized containerized applications, and the authenticity of the source from which the validation file was received). The public key may be obtained from a base firmware image of the device. The determining of the handling of the containerized application at the device may include determining whether the hash identifier of the containerized application is included in the list of hash identifiers of authorized containerized applications. The determining of the handling of the containerized application at the device may include determining, for a process for the containerized application initiated at the device (e.g., a download of the containerized application to the device or an execution of the containerized application at the device), whether to permit the process to continue or to prevent the process from continuing (e.g., permitting the process for the containerized application to continue on the device based on a determination that the hash identifier of the containerized application is included in the list of hash identifiers of authorized containerized applications or preventing the process for the containerized application from continuing on the device based on a determination that the hash identifier of the containerized application is not included in the list of hash identifiers of authorized containerized applications). The determining of the handling of the containerized application at the device may include sending, toward the server, a request for validation of the hash identifier of the containerized application, receiving, from the server, a validation response including an indication as to whether validation of the hash identifier of the containerized application by the server was successful or unsuccessful, and determining, based on the validation response, handling of the containerized application at the device. The request for validation of the hash identifier of the containerized application may be sent toward the server without a delay based on a determination that the hash identifier of the containerized application is not found in the list of hash identifiers of authorized containerized applications. The request for validation of the hash identifier of the containerized application may be sent toward the server with a delay based on a determination that the hash identifier of the containerized application is found in the list of hash identifiers of authorized containerized applications. The determining of the handling of the containerized application at the device, based on the validation response, may include determining handling of execution of the containerized application on the device based on the indication as to whether validation of the hash identifier of the containerized application by the server was successful or unsuccessful (e.g., permitting execution of the containerized application to continue on the device based on a determination that the validation response includes an indication that validation of the hash identifier of the containerized application by the server was successful or preventing execution of the containerized application from continuing on the device based on a determination that the validation response includes an indication that validation of the hash identifier of the containerized application by the server was unsuccessful). The validation file may further include a hash of a complete tarball of the containerized application. The determination of the handling of the containerized application may include computing, at the device in response to a download of the containerized application to the device, a hash of a complete tarball of the containerized application, determining, at the device, whether the hash of the complete tarball of the containerized application is included in the validation file, and determining, at the device based on whether the hash of the complete tarball of the containerized application is included in the validation file, handling of the containerized application at the device (e.g., permitting the containerized application to remain on the device based on a determination that the hash of the complete tarball of the containerized application is included in the validation file or removing the containerized application from the device based on a determination that the hash of the complete tarball of the containerized application is not included in the validation file). It will be appreciated that various other features and functions presented herein may be incorporated within the context of the method 300 of FIG. 3.

Figure 4:
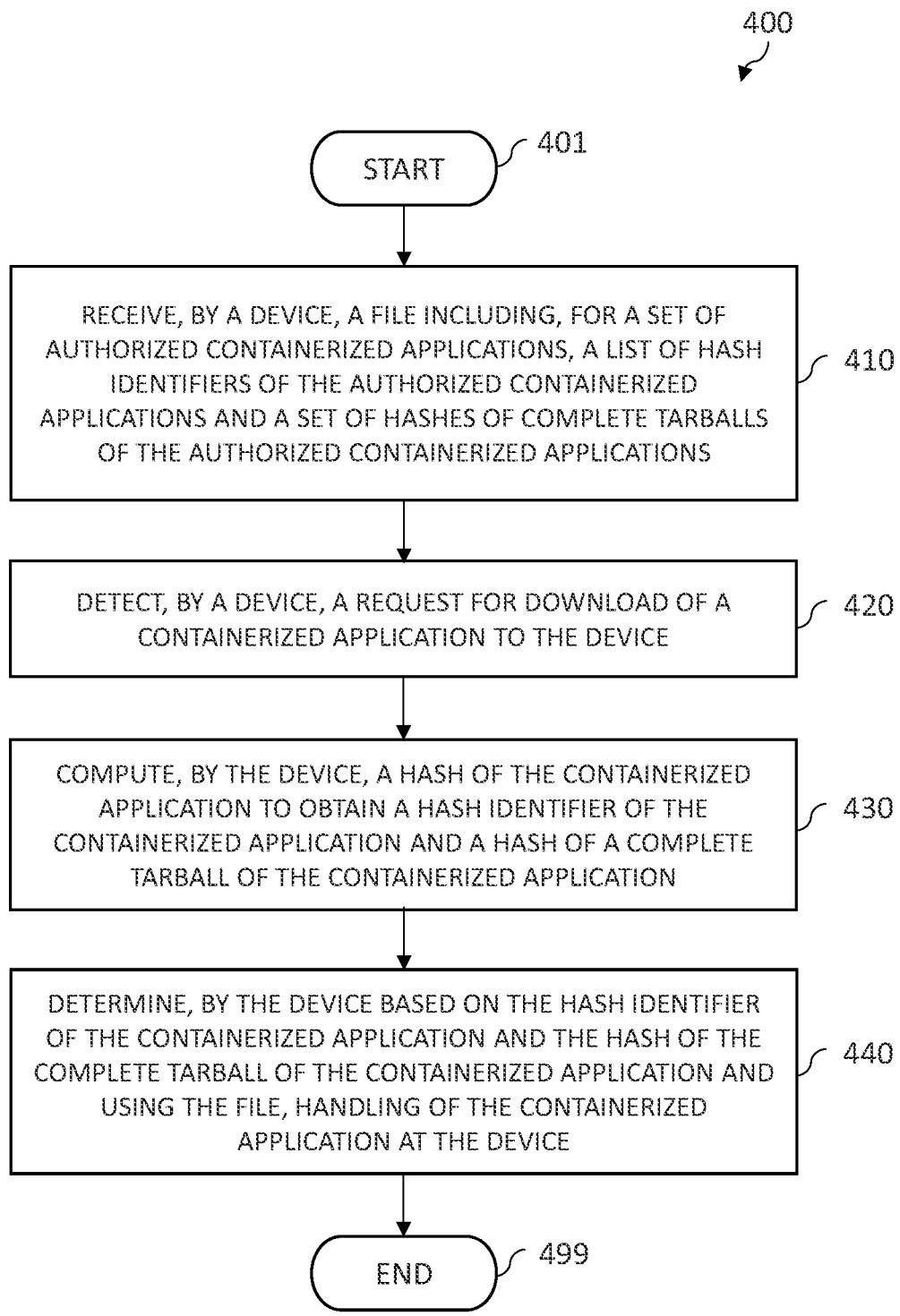
FIG. 4 depicts an example embodiment of a method for use by a customer premises equipment to support security for a containerized application.

FIG. 4 depicts an example embodiment of a method for use by a device (e.g., a customer premises equipment or other device) to support security for a containerized application. It will be appreciated that, although primarily presented herein as being performed serially, at least a portion of the functions of the method 400 may be performed contemporaneously or in a different order than as presented in FIG. 4. At block 401, the method 400 begins. At block 410, receive, by a device, a validation file including, for a set of authorized containerized applications, a list of hash identifiers of the authorized containerized applications and a set of hashes of complete tarballs of the authorized containerized applications. At block 420, detect, by a device, a request for download of a containerized application to the device. At block 430, compute, by the device, a hash of the containerized application to obtain a hash identifier of the containerized application and a hash of a complete tarball of the containerized application. At block 440, determine, by the device based on the hash identifier of the containerized application and the hash of the complete tarball of the containerized application and using the validation file, handling of the containerized application at the device. The validation file may be received by the device at the time of boot-up or re-boot of the device. The validation file may be received based on a request by the device for the validation file. The validation file may be validated by the device based on validation of a validation signature received with the validation file. The validation signature received with the file (created based on a private key) may be validated based on a public key file (including a public key) on the device. The public key available on the device may be obtained from a base firmware image of the device. The determining of the handling of the containerized application at the device may include determining whether the hash of the complete tarball of the containerized application is included in the hashes of the complete tarballs of the authorized containerized applications. The determining of the handling of the containerized application at the device may include determining whether the hash identifier of the containerized application is included in the list of hash identifiers of authorized containerized applications. The determining of the handling of the containerized application at the device may include determining whether the hash of the complete tarball of the containerized application is included in the hashes of the complete tarballs of the authorized containerized applications and, based on a determination that the hash of the complete tarball of the containerized application is included in the hashes of the complete tarballs of the authorized containerized applications, determining whether the hash identifier of the containerized application is included in the list of hash identifiers of authorized containerized applications. The determining of the handling of the containerized application at the device may include determining whether to permit the containerized application to remain on the device after being downloaded or determining whether to remove the containerized application from the device after being downloaded. The determining of the handling of the containerized application at the device may include permitting the containerized application to remain on the device after being downloaded based on a determination that the hash of the complete tarball of the containerized application is included in the hashes of the complete tarballs of the authorized containerized applications and that the hash identifier of the containerized application is included in the list of hash identifiers of authorized containerized applications. The determining of the handling of the containerized application at the device may include removing the containerized application from the device after being downloaded based on a determination that the hash of the complete tarball of the containerized application is not included in the hashes of the complete tarballs of the authorized containerized applications or that the hash identifier of the containerized application is not included in the list of hash identifiers of authorized containerized applications. It will be appreciated that various other features and functions presented herein may be incorporated within the context of the method 400 of FIG. 4.

Figure 5:
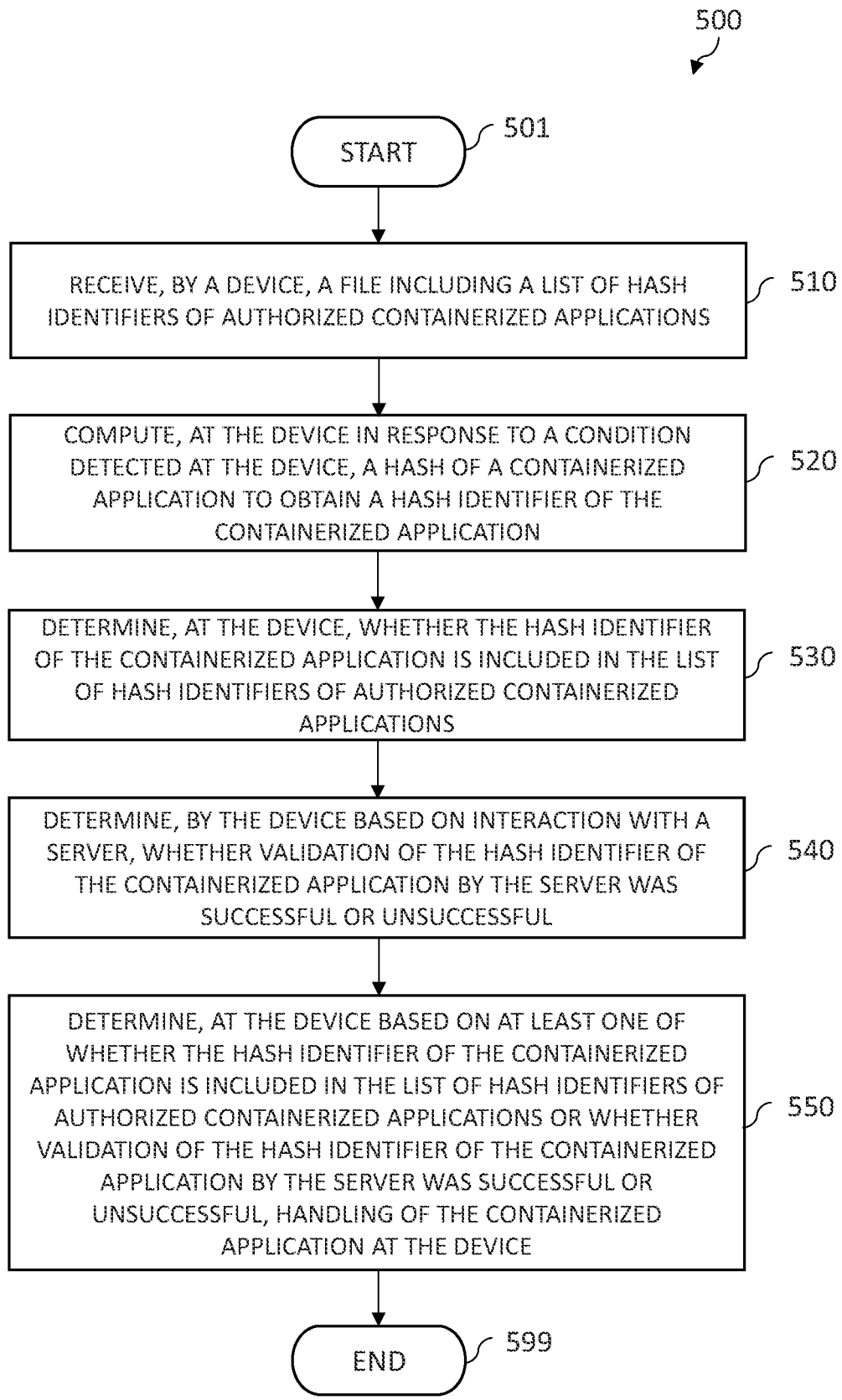
FIG. 5 depicts an example embodiment of a method for use by a customer premises equipment to support security for a containerized application.

FIG. 5 depicts an example embodiment of a method for use by a device (e.g., a customer premises equipment or other device) to support security for a containerized application. It will be appreciated that, although primarily presented herein as being performed serially, at least a portion of the functions of the method 500 may be performed contemporaneously or in a different order than as presented in FIG. 5. At block 501, the method 500 begins. At block 510, receive, by a device, a file including a list of hash identifiers of authorized containerized applications. At block 520, compute, at the device in response to a condition detected at the device, a hash of a containerized application to obtain a hash identifier of the containerized application. At block 530, determine, at the device, whether the hash identifier of the containerized application is included in the list of hash identifiers of authorized containerized applications. At block 540, determine, by the device based on interaction with a server, whether validation of the hash identifier of the containerized application by the server was successful or unsuccessful. At block 550, determine, at the device based on at least one of whether the hash identifier of the containerized application is included in the list of hash identifiers of authorized containerized applications or whether validation of the hash identifier of the containerized application by the server was successful or unsuccessful, handling of the containerized application at the device. The device may send a request for the file toward the server based on a booting of the device. The device may validate the file based on validation of a validation signature, received with the file, using a public key on the device (e.g., validating the integrity of the contents of the file and validating the authenticity of the source of the file). The public key may be obtained from a base firmware image of the device. The condition detected at the device may include at least one of a booting or rebooting of the device, a download of the containerized application to the device, or a request to start the containerized application on the device. The device may determine whether validation of the hash identifier of the containerized application by the server was successful or unsuccessful by sending, by the device toward a server, a request for validation of the hash identifier of the containerized application and receiving, by the device from the server, a validation response including an indication as to whether validation of the hash identifier of the containerized application by the server was successful or unsuccessful. The request for validation of the hash identifier of the containerized application may be sent toward the server without a delay based on a determination that the hash identifier of the containerized application is not found in the list of hash identifiers of authorized containerized applications. The request for validation of the hash identifier of the containerized application may be sent toward the server with a delay based on a determination that the hash identifier of the containerized application is found in the list of hash identifiers of authorized containerized applications. The handling of the containerized application at the device may include determining, for a process for the containerized application initiated at the device, whether to permit the process to continue or to prevent the process from continuing. The process for the containerized application may include a download of the containerized application to the device or an execution of the containerized application at the device. The determination of the handling of the containerized application at the device may include permitting a process for the containerized application to continue on the device based on a determination that the hash identifier of the containerized application is included in the list of hash identifiers of authorized containerized applications and a determination that validation of the hash identifier of the containerized application by the server was successful. The determination of the handling of the containerized application at the device may include preventing a process for the containerized application from continuing on the device based on a determination that the hash identifier of the containerized application is not included in the list of hash identifiers of authorized containerized applications or a determination that validation of the hash identifier of the containerized application by the server was unsuccessful. The condition detected at the device may include initiation of execution of the containerized application on the device (e.g., permitting execution of the containerized application to continue on the device based on a determination that the validation response includes an indication that validation of the hash identifier of the containerized application by the server was successful or preventing execution of the containerized application from continuing on the device based on a determination that the validation response includes an indication that validation of the hash identifier of the containerized application by the server was unsuccessful). It will be appreciated that various other features and functions presented herein may be incorporated within the context of the method 500 of FIG. 5.

Figure 6:
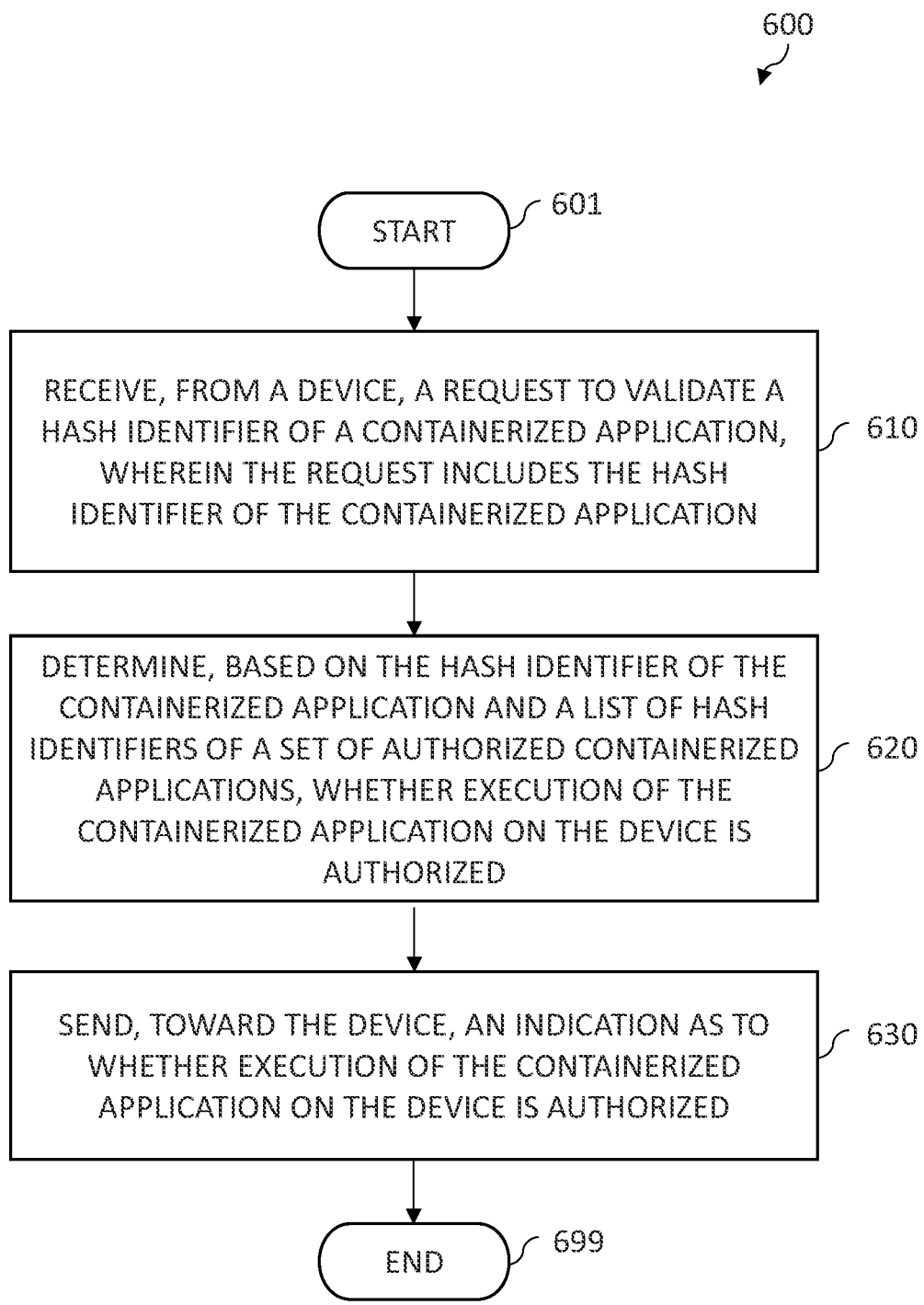
FIG. 6 depicts an example embodiment of a method for use by a server to support security for a containerized application.

FIG. 6 depicts an example embodiment of a method for use by a device (e.g., a server or other device) to support security for containerized application. It will be appreciated that, although primarily presented herein as being performed serially, at least a portion of the functions of the method 600 may be performed contemporaneously or in a different order than as presented in FIG. 6. At block 601, the method 600 begins. At block 610, receive, from a device, a request to validate a hash identifier of a containerized application, wherein the request includes the hash identifier of the containerized application. At block 620, determine, based on the hash identifier of the containerized application and a list of hash identifiers of a set of authorized containerized applications, whether execution of the containerized application on the device is authorized. At block 630, send, toward the device, an indication as to whether execution of the containerized application on the device is authorized. At block 699, the method 600 ends. It will be appreciated that various other features and functions presented herein may be incorporated within the context of the method 600 of FIG. 6.

Various example embodiments for supporting security for containerized applications may provide various advantages or potential advantages. For example, various example embodiments for supporting security for containerized applications may be configured to support a framework configured to monitor and secure the download of containers as well as the runtime execution of containers, thereby providing a mechanism to verify and validate that the containers are in fact approved and authorized by the service provider. For example, various example embodiments for supporting security for containerized applications may be configured to properly secure and validate containerized applications that are deployed to customer devices based on a framework configured to protect against the download of non-approved or malicious containers and to monitor the run-time execution of containers in various types of execution environments (e.g., OCI, LXC, Docker, or the like), thereby providing a capability to verify and validate that the containers are in fact approved and authorized by the service provider and that the customer device has not been compromised. For example, various example embodiments for supporting security for containerized applications may be configured to provide security for containerized applications in environments utilizing various Broadband Forum device management standards which, while generally covering the necessary messaging to provide basic lifecycle management of independent software modules (e.g., containers) that are part of one or more execution environments (e.g., OCI, LXC, Docker, or the like) and specifying that downloads may be done using secure mechanisms (e.g., HTTPS encrypted requests), otherwise may not provide mechanisms to validate and verify that downloaded containerized applications pass an integrity check to verify that the containerized applications have not been modified or tampered with by a third party or other malicious entity. For example, various example embodiments for supporting security for containerized applications may be configured to support security for containerized applications in a manner that is compatible with existing Broadband Forum standards without requiring changes in existing Broadband Forum standards or the existing CPE messaging of existing Broadband Forum standards. For example, various example embodiments for supporting security for containerized applications may be configured to protect against unique surface attack vectors that come from broadband CPE devices. For example, various example embodiments for supporting security for containerized applications, by supporting validation checks at boot-up, download of containerized applications, and runtime execution of containerized applications, may make it quite difficult for a hacker to find methods to compromise each of these validation checks and, thus, difficult for the hacker to compromise the containerized application or the device on which the containerized application is running. Various example embodiments for supporting security for containerized applications may provide various other advantages or potential advantages.

Figure 7:
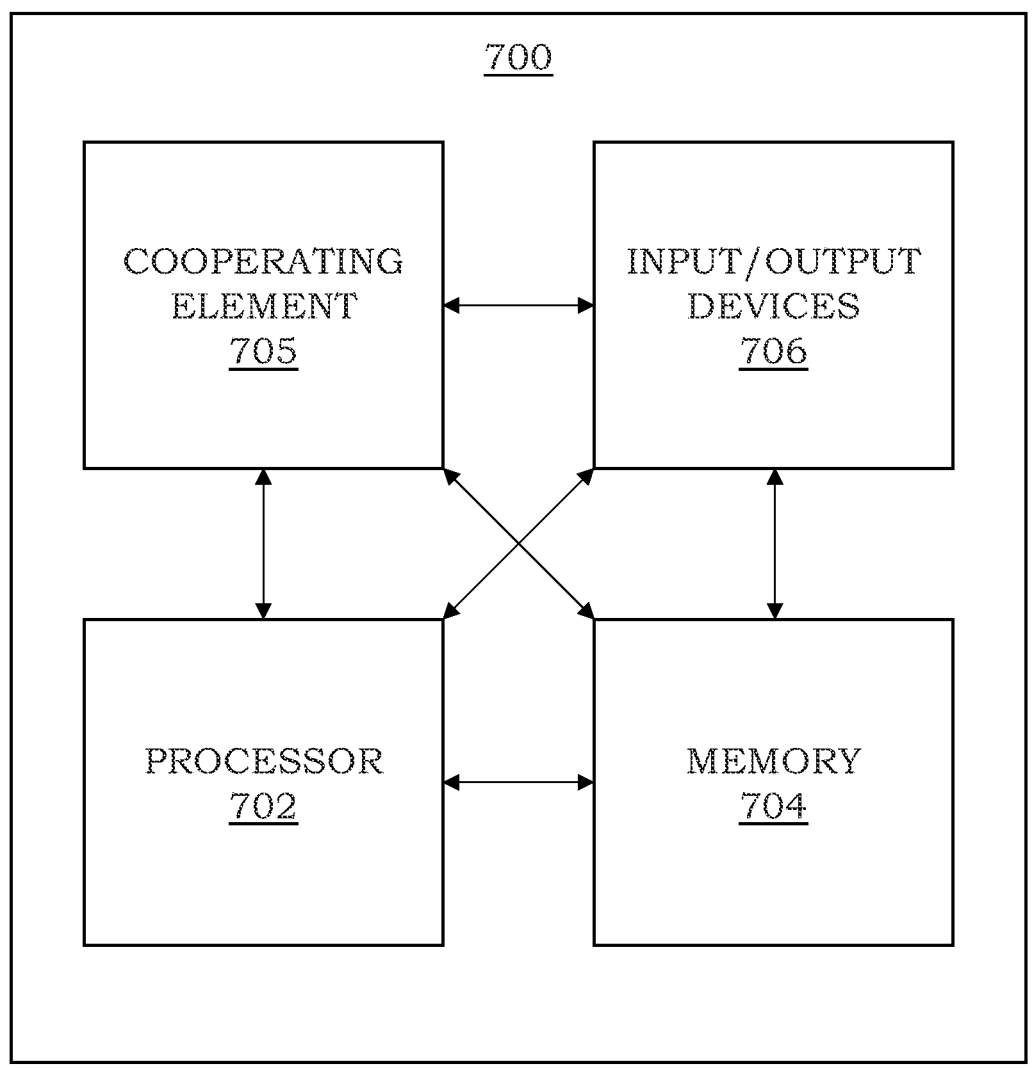
FIG. 7 depicts an example embodiment of a computer suitable for use in performing various functions presented herein.

FIG. 7 depicts an example embodiment of a computer suitable for use in performing various functions presented herein.

The computer 700 includes a processor 702 (e.g., a central processing unit (CPU), a processor, a processor having a set of processor cores, a processor core of a processor, or the like) and a memory 704 (e.g., a random access memory, a read only memory, or the like). The processor 702 and the memory 704 may be communicatively connected. In at least some example embodiments, the computer 700 may include at least one processor and at least one memory including computer product code, wherein the at least one memory and the computer product code are configured, with the at least one processor, to cause the computer 700 to perform various functions presented herein.

The computer 700 also may include a cooperating element 705. The cooperating element 705 may be a hardware device. The cooperating element 705 may be a process that can be loaded into the memory 704 and executed by the processor 702 to implement various functions presented herein (in which case, for example, the cooperating element 705 (including associated data structures) can be stored on a non-transitory computer-readable storage medium, such as a storage device or other suitable type of storage element (e.g., a magnetic drive, an optical drive, or the like)).

The computer 700 also may include one or more input/output devices 706. The input/output devices 706 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a compact disk drive, a hard disk drive, a solid state drive, or the like), or the like, as well as various combinations thereof.

It will be appreciated that computer 700 may represent a general architecture and functionality suitable for implementing functional elements described herein, portions of functional elements described herein, or the like, as well as various combinations thereof. For example, computer 700 may provide a general architecture and functionality that is suitable for implementing one or more elements presented herein, such as node or a portion thereof, a controller or a portion thereof, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
    at least one processor; and
    at least one memory storing instructions which, when executed by the at least one processor, cause the apparatus to at least:
        receive, by a device, a file including a list of hash identifiers of authorized containerized applications;
        compute, at the device in response to a condition detected at the device, a hash of a containerized application to obtain a hash identifier of the containerized application;
        determine, at the device, whether the hash identifier of the containerized application is included in the list of hash identifiers of authorized containerized applications;
        determine, by the device based on interaction with a server, whether validation of the hash identifier of the containerized application by the server was successful or unsuccessful; and
        determine, at the device based on at least one of whether the hash identifier of the containerized application is included in the list of hash identifiers of authorized containerized applications or whether validation of the hash identifier of the containerized application by the server was successful or unsuccessful, handling of the containerized application at the device.

2. The apparatus of claim 1, wherein the instructions, when executed by the at least one processor, cause the apparatus to at least:
    send, by the device toward the server based on a booting of the device, a request for the file.

3. The apparatus of claim 1, wherein the instructions, when executed by the at least one processor, cause the apparatus to at least:
    validate, by the device based on validation of a validation signature received with the file, the file.

4. The apparatus of claim 3, wherein the validation signature received with the file is validated by the device based on a public key on the device.

5. The apparatus of claim 4, wherein the public key is obtained from a base firmware image of the device.

6. The apparatus of claim 1, wherein the condition detected at the device includes at least one of a booting or rebooting of the device, a download of the containerized application to the device, or a request to start the containerized application on the device.

7. The apparatus of claim 1, wherein the hash of the containerized application is computed based on a Secure Hash Algorithm (SHA) hash.

8. The apparatus of claim 1, wherein, to determine whether validation of the hash identifier of the containerized application by the server was successful or unsuccessful, the instructions, when executed by the at least one processor, cause the apparatus to at least:
    send, by the device toward a server, a request for validation of the hash identifier of the containerized application; and
    receive, by the device from the server, a validation response including an indication as to whether validation of the hash identifier of the containerized application by the server was successful or unsuccessful.

9. The apparatus of claim 8, wherein the request for validation of the hash identifier of the containerized application is sent toward the server without a delay based on a determination that the hash identifier of the containerized application is not found in the list of hash identifiers of authorized containerized applications.

10. The apparatus of claim 8, wherein the request for validation of the hash identifier of the containerized application is sent toward the server with a delay based on a determination that the hash identifier of the containerized application is found in the list of hash identifiers of authorized containerized applications.

11. The apparatus of claim 1, wherein, to determine the handling of the containerized application at the device, the instructions, when executed by the at least one processor, cause the apparatus to at least:
    determine, for a process for the containerized application initiated at the device, whether to permit the process to continue or to prevent the process from continuing.

12. The apparatus of claim 11, wherein the process for the containerized application includes a download of the containerized application to the device or an execution of the containerized application at the device.

13. The apparatus of claim 1, wherein, to determine the handling of the containerized application at the device, the instructions, when executed by the at least one processor, cause the apparatus to at least:
    permit a process for the containerized application to continue on the device based on a determination that the hash identifier of the containerized application is included in the list of hash identifiers of authorized containerized applications and a determination that validation of the hash identifier of the containerized application by the server was successful.

14. The apparatus of claim 1, wherein, to determine the handling of the containerized application at the device, the instructions, when executed by the at least one processor, cause the apparatus to at least:

prevent a process for the containerized application from continuing on the device based on a determination that the hash identifier of the containerized application is not included in the list of hash identifiers of authorized containerized applications or a determination that validation of the hash identifier of the containerized application by the server was unsuccessful.

15. The apparatus of claim 1, wherein the condition detected at the device includes initiation of execution of the containerized application on the device.

16. The apparatus of claim 15, wherein, to determine the handling of the containerized application at the device, the instructions, when executed by the at least one processor, cause the apparatus to at least:

permit execution of the containerized application to continue on the device based on a determination that the validation response includes an indication that validation of the hash identifier of the containerized application by the server was successful.

17. The apparatus of claim 15, wherein the instructions, when executed by the at least one processor, cause the apparatus to at least:

prevent execution of the containerized application from continuing on the device based on a determination that the validation response includes an indication that validation of the hash identifier of the containerized application by the server was unsuccessful.

18. The apparatus of claim 1, wherein the instructions, when executed by the at least one processor, cause the apparatus to at least:

compute, at the device in response to a download of the containerized application to the device, a hash of a complete tarball of the containerized application;

determine, at the device, whether the hash of the complete tarball of the containerized application is included in the file; and determine, at the device based on whether the hash of the complete tarball of the containerized application is included in the file, handling of the download of the containerized application at the device.

19. The apparatus of claim 18, wherein, to determine the handling of the download of the containerized application at the device, the instructions, when executed by the at least one processor, cause the apparatus to at least:

permit the containerized application to remain on the device based on a determination that the hash of the complete tarball of the containerized application is included in the file.

20. The apparatus of claim 18, wherein, to determine the handling of the download of the containerized application at the device, the instructions, when executed by the at least one processor, cause the apparatus to at least:

remove the containerized application from the device based on a determination that the hash of the complete tarball of the containerized application is not included in the file.

21. The apparatus of claim 18, wherein the hash of the complete tarball of the containerized application is a Message-Digest (MD) Algorithm hash.

22. The apparatus of claim 1, wherein the device includes at least one of a residential gateway, a WiFi access point, a fixed cellular access point, an optical network termination, a modem, a router, a firewall, a cable set-top box, a computer, a smartphone, or an Internet-of-Things device.

23. A method, comprising:

receiving, by a device, a file including a list of hash identifiers of authorized containerized applications;

computing, at the device in response to a condition detected at the device, a hash of a containerized application to obtain a hash identifier of the containerized application;

determining, at the device, whether the hash identifier of the containerized application is included in the list of hash identifiers of authorized containerized applications;

determining, by the device based on interaction with a server, whether validation of the hash identifier of the containerized application by the server was successful or unsuccessful; and determining, at the device based on at least one of whether the hash identifier of the containerized application is included in the list of hash identifiers of authorized containerized applications or whether validation of the hash identifier of the containerized application by the server was successful or unsuccessful, handling of the containerized application at the device.

24. An apparatus, comprising:

at least one processor; and at least one memory including instructions which, when executed by the at least one processor, cause the apparatus at least to:

receive, by a device configured to support execution of a containerized application based on a container, a message from a server for a container start condition;

compute, by the device based on the message from the server for the container start condition, a hash to obtain a hash identifier;

determine, by the device based on a comparison of the hash identifier to a list of hash identifiers in a validation file available on the device, whether the hash identifier is included in the list of hash identifiers;

determine, by the device based on interaction with the server, whether validation of the hash identifier by the server was successful; and determine, at the device based on whether the hash identifier is included in the list of hash identifiers and based on whether validation of the hash identifier by the server was successful, whether to permit continuation of a process related to the container start condition.

* * * * *